United States Patent
Chang et al.

(10) Patent No.: US 8,895,190 B2
(45) Date of Patent: Nov. 25, 2014

(54) PREPARATION METHOD OF LITHIUM-METAL COMPOSITE OXIDES

(75) Inventors: Sung-Kyun Chang, Daejeon (KR);
Eui-Yong Bang, Daejeon (KR);
Min-Chul Jang, Daejeon (KR);
Sang-Hoon Choy, Daejeon (KR);
Ki-Young Lee, Daejeon (KR); Wan-Jae Myeong, Daejeon (KR); Kyu-Ho Song, Daejeon (KR); Joo-Hyeong Lee, Daejeon (KR); Young-Sik Hahn, Daejeon (KR); Myung-Ho Cho, Daejeon (KR); Yong-Tae Lee, Jeollabuk-do (KR)

(73) Assignees: LG Chem, Ltd. (KR); Hanwha Chemical Corporation (KR)

( * ) Notice: Subject to any disclaimer, the term of this patent is extended or adjusted under 35 U.S.C. 154(b) by 1518 days.

(21) Appl. No.: 12/223,941

(22) PCT Filed: Feb. 16, 2007

(86) PCT No.: PCT/KR2007/000851
§ 371 (c)(1),
(2), (4) Date: Dec. 9, 2009

(87) PCT Pub. No.: WO2007/094644
PCT Pub. Date: Aug. 23, 2007

(65) Prior Publication Data
US 2010/0227221 A1    Sep. 9, 2010

(30) Foreign Application Priority Data

Feb. 17, 2006  (KR) .................. 10-2006-0015849

(51) Int. Cl.
*H01M 4/485* (2010.01)
*H01M 4/88* (2006.01)

(52) U.S. Cl.
USPC .............. 429/231.95; 252/182.1; 29/623.1

(58) Field of Classification Search
None
See application file for complete search history.

(56) References Cited

U.S. PATENT DOCUMENTS

| 6,447,739 B1 | 9/2002 | Krynitz et al. |
| 6,692,665 B2 * | 2/2004 | Shima et al. ............... 252/518.1 |

(Continued)

FOREIGN PATENT DOCUMENTS

| JP | 2000-072445 A | 3/2000 |
| JP | 2001-163700 A | 6/2001 |

(Continued)

OTHER PUBLICATIONS

Office Action issued in corresponding Chinese Patent Application No. 200780013710.6 dated Jan. 22, 2010.

(Continued)

*Primary Examiner* — Alix Echelmeyer
(74) *Attorney, Agent, or Firm* — Lerner, David, Littenberg, Krumholz & Mentlik, LLP

(57) ABSTRACT

Disclosed is a method for preparing a lithium-metal composite oxide, the method comprising the steps of: (a) mixing an aqueous solution of one or more transition metal-containing precursor compounds with an alkalifying agent and a lithium precursor compound to precipitate hydroxides of the transition metals; (b) mixing the mixture of step (a) with water under supercritical or subcritical conditions to synthesize a lithium-metal composite oxide, and drying the lithium-metal composite oxide; and (c) subjecting the dried lithium-metal composite oxide either to calcination or to granulation and then calcination. Also disclosed are an electrode comprising the lithium-metal composite oxide, and an electrochemical device comprising the electrode. In the disclosed invention, a lithium-metal composite oxide synthesized based on the prior supercritical hydrothermal synthesis method is subjected either to calcination or to granulation and then calcination. Thus, unlike the prior dry calcination method or wet precipitation method, a uniform solid solution can be formed and the ordering of metals in the composite oxide can be improved. Accordingly, the lithium-metal composite oxide can show crystal stability and excellent electrochemical properties.

20 Claims, 16 Drawing Sheets

(56) References Cited

U.S. PATENT DOCUMENTS

| | | |
|---|---|---|
| 2001/0010807 A1 | 8/2001 | Matsubara |
| 2004/0053133 A1* | 3/2004 | Li ............................ 429/231.1 |
| 2006/0182677 A1* | 8/2006 | Myeong et al. ............... 423/263 |
| 2007/0020171 A1* | 1/2007 | Waki et al. .................... 423/599 |

FOREIGN PATENT DOCUMENTS

| | | |
|---|---|---|
| JP | 2001-202947 A | 7/2001 |
| JP | 2001-206722 A | 7/2001 |
| JP | 2003-151548 A | 5/2003 |
| JP | 2004-095386 A | 3/2004 |
| JP | 2005038772 A | 2/2005 |
| JP | 2005-144451 A | 6/2005 |
| KR | 20050044771 A | 5/2005 |
| KR | 20050096019 A | 10/2005 |
| KR | 20070018303 A | 2/2007 |
| WO | 95/34919 A1 | 12/1995 |
| WO | WO-01/48842 A1 | 7/2001 |
| WO | 02/078105 A1 | 10/2002 |
| WO | 2004/007350 A1 | 1/2004 |
| WO | 2005/053064 A1 | 6/2005 |
| WO | 2007/094645 A1 | 8/2007 |

OTHER PUBLICATIONS

Office Action issued by the Taiwan Patent Office to reject corresponding Taiwan Patent Application No. 96106032 on Dec. 8, 2010.

Kanamura et al., "Electrochemical Characteristics of $LiCoO_2$ and $LiMn_2O_4$ Prepared in Supercritical Water", Key Engineering Materials, vol. 181-182, pp. 147-150, 2000.

Wofford et al., "Solubility of Potassium Hydroxide and Potassium Phosphate in Supercritical Water", Journal of Chemical Engineering Data, vol. 40, No. 4, pp. 968-973, 1995.

\* cited by examiner (a)

(b)

(a)

(b)

PREPARATION METHOD OF LITHIUM-METAL COMPOSITE OXIDES

CROSS REFERENCE TO RELATED APPLICATIONS

The present application is a national phase entry under 35 U.S.C. §371 of International Application No. PCT/KR2007/000851, filed Feb. 16, 2007, published in English, which claims priority from Korean Patent Application No. 10-2006-0015849, filed Feb. 17, 2006. The disclosures of said applications are incorporated by reference herein.

TECHNICAL FIELD

The present invention relates to a novel method for preparing a lithium-metal composite oxide having crystallographical stability and high-density characteristics. Also, it relates to an electrode comprising the lithium-metal composite oxide prepared according to said method, and an electrochemical device, which comprises said electrode, and thus shows high-capacity and long cycle life characteristics.

BACKGROUND ART

Recently, as the mobility and portability of electrical and electronic devices have increased, the demand for secondary batteries has rapidly increased. Lithium secondary batteries started to be produced industrially by Sony Corp., Japan, in the beginning of the 1990s, and occupy the majority of the portable phone and notebook computer markets, because such lithium secondary batteries have advantages over prior Ni—Cd and Ni-MH batteries in that they have light weight and high capacity. Recently, such lithium secondary batteries have been increasingly used in high-output large-capacity batteries in electric power tools, electric bicycles, electric scooters, game machines, wireless cleaners, service robots, hybrid vehicles, etc.

Lithium ion secondary batteries generally employ lithium cobaltate ($LiCoO_2$) as a cathode active material, carbon as an anode active material, and lithium hexafluorophosphate as an electrolyte. As the cathode active material, lithium cobaltate ($LiCoO_2$) and lithium nickelate ($LiNiO_2$), having a layered structure, and lithium manganate having a spinel structure, are known, but lithium cobaltate is mostly used in practice for commercial purposes. However, because not only the supply and demand of cobalt as a main component is unstable, but also the cost of cobalt is high, materials obtained by partially substituting cobalt with other transition metals such as Ni and Mn, or spinel lithium manganate containing little or no cobalt, etc., started to be commercially used. Also, novel compounds showing high structural stability even under high voltages, or materials obtained by doping or coating existing cathode materials with other metal oxides so as to have improved stability, have been developed.

Among prior methods of preparing cathode active materials, the most widely known methods include a dry calcination method and a wet precipitation method. According to the dry calcination method, a cathode active material is prepared by mixing an oxide or hydroxide of a transition metal such as cobalt (Co) with lithium carbonate or lithium hydroxide as a lithium source in a dry state, and then calcining the mixture at a high temperature of 700-1000° C. for 5-48 hours. The dry calcination method has an advantage in that it is easy to approach, because it is a technology which has been conventionally frequently used. However, it has shortcomings in that it is difficult to obtain single-phase products because it is difficult to mix raw materials uniformly, and in the case of multi-component cathode active materials consisting of two or more transition metals, it is difficult to arrange two or more elements uniformly to the atomic level. Also, in the case of using methods of doping or substituting cathode active materials with a specific metal component in order to improve electrochemical performance, there are problems in that the specific metal component added in small amounts is difficult to mix uniformly, and the loss thereof necessarily occurs a grinding and classifying process for obtaining granules having the desired size.

Another conventional method for preparing cathode active materials is the wet precipitation method. According to the wet precipitation method, a cathode active material is prepared by dissolving in water a salt containing a transition metal such as cobalt (Co), adding alkali to the solution to precipitate the transition metal in the form of transition metal hydroxide, filtering and drying the precipitate, mixing the dried material with lithium carbonate or lithium hydroxide as a lithium source in a dry state, and then calcining the mixture at a high temperature of 700-1000° C. for 1-48 hours. The wet precipitation method is known to easily obtain a uniform mixture by co-precipitating two or more transition metal elements, but has problems in that it requires a long period of time for the precipitation reaction, is performed using a complicated process, and causes waste acids as by-products. In addition, various methods, including sol-gel methods, hydrothermal methods, spray pyrolysis methods and ion exchange methods, have been suggested as methods for preparing cathode active materials for lithium secondary batteries.

Meanwhile, methods of preparing $LiCoO_2$ particles, and $LiMn_2O_4$ particles, etc., using supercritical water, have recently been reported (K. Kanamura, et al., Key Engineering Materials, 181-162 (2000), pp. 147-150). Japanese Patent Laid-Open Publication No. JP2000-72445A discloses a method of preparing a metal oxide for cathode active materials by allowing lithium ions to react with transition metal ions in supercritical or subcritical conditions in a batch-type reactor. Also, Japanese Patent Laid-Open Publication No. JP2001-163700 discloses a method of preparing a metal oxide for cathode active materials by allowing lithium ions to react with transition metal ions in supercritical or subcritical conditions in a batch-type reactor and a continuous reactor. According to the disclosure of such patent documents, in the case of the batch-type reactor, an increase in Li/Co ratio, an increase in alkali molar ratio, an increase in nitric acid concentration and the addition of an oxidizing agent lead to a decrease in the content of impurity $Co_3O_4$ and an increase in the content of single-phase $LiCoO_2$. However, particles obtained according to the disclosure of such patents are not suitable for practical use as cathode active materials, because the purity of $LiCoO_2$ in the particles is only a maximum of 97.8%. Also, in the case of using the continuous reactor, a metal oxide for cathode active materials is synthesized by continuously pumping an aqueous cobalt salt solution or an aqueous manganese salt solution under pressure into the reactor, adding supercritical water and hydrogen peroxide ($H_2O_2$) thereto, and then allowing the mixture to react in conditions of about 400° C. and about 300 bar. In this case, the reaction time is as relatively short as 30 seconds or less, but the synthesized product is known to have low purity and poor electrochemical properties. Also, when the above-described methods are used to prepare single metal oxide such as lithium cobaltate or lithium manganate, they will provide highly crystalline particles having a size as large as submicrons (μm). However, these methods have problems in that, when they are used to prepare a multicomponent (more two components) metal oxide, they cannot synthesize crystals having excellent solid-solution stability because the crystallization rates of the components are different from each other, and also the synthesized particles are difficult to apply as cathode active materials because such particles are as excessively small as the nanometer scale. Thus, there is an urgent need to develop a novel cathode active material, which satisfies high performance and low cost requirements, and a preparation method thereof.

DISCLOSURE OF THE INVENTION

Figure 1:
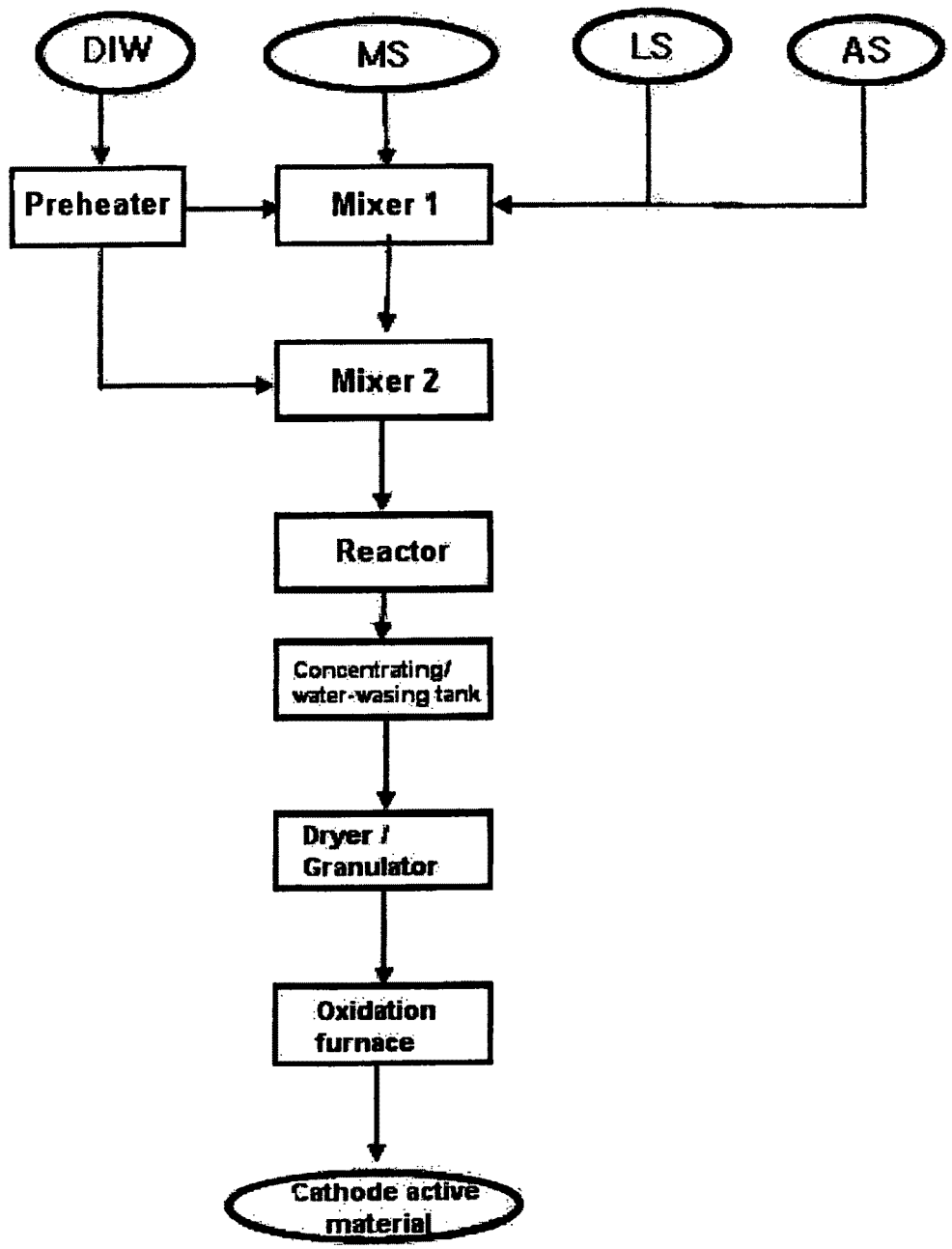
FIG. 1 schematically shows an example of a preparation process according to the present invention.

The present inventors have found that, when a novel preparation method comprising either calcining or granulating and then calcining a lithium-metal composite oxide synthesized using subcritical water or supercritical water according to a hydrothermal synthesis method is performed, the resulting lithium-metal composite oxide has a particle size larger than that of a multicomponent metal oxide synthesized using subcritical or supercritical water according to the prior method, and thus can be used as a multicomponent cathode active material, and also it is possible to form a solid solution more uniform than that prepared using the prior dry calcination method or wet precipitation method. In particular, it could be seen that the lithium-metal composite oxide shows crystal stability and excellent physical properties as a result of an improvement in the ordering of metals, and thus can provide a battery having high capacity characteristics, long cycle life characteristics and improved rate characteristics.

Accordingly, it is an object of the present invention to provide a novel method for preparing the above-described lithium-metal composite oxide, an electrode comprising the lithium-metal composite oxide prepared according to said method, and an electrochemical device comprising said electrode.

To achieve the above object, in one aspect, the present invention provides a method for preparing a lithium-metal composite oxide, the method comprising the steps of: (a) mixing an aqueous solution of one or more transition metal-containing precursor compounds with an alkalifying agent and a lithium precursor compound to precipitate an hydroxide of the transition metal; (b) mixing the mixture of step (a) with water under supercritical or subcritical conditions to synthesize a lithium-metal composite oxide, and drying the lithium-metal composite oxide; and (c) subjecting the dried lithium-metal composite oxide either to calcination or to granulation and then calcination.

In another aspect, the present invention provides an electrode comprising the lithium-metal composite oxide prepared according to said method.

In still another aspect, the present invention provides an electrochemical device, preferably a lithium secondary battery, comprising said electrode.

Hereinafter, the present invention will be described in detail.

In the hydrothermal synthesis method that uses supercritical or subcritical water, a crystal structure having reduced solid-solution stability because the crystallization rates of the components of a multicomponent lithium-metal composite oxide are different from each other, and also the synthesized particles are difficult to apply as cathode active materials because such particles are as excessively small as the nanometer scale. In fact, if an electrode is formed only of primary particles (before granulation) produced according to the prior hydrothermal synthesis method, there will be problems in that electrode density is insufficient, and capacity per volume and capacity per mass are very reduced (see Table 1).

Accordingly, in the present invention, a solid solution, which is more uniform than that prepared according to the dry calcination method or the wet precipitation method, can be easily formed by forming a uniform transition metal precipitate, and then mixing the precipitate with high-temperature and high-pressure supercritical or subcritical water, thus synthesizing lithium-metal composite oxide ultrafine particles in which lithium ions are inserted into the previously precipitated transition metal hydroxide. Also, the synthesized composite oxide fine particles can be stably grown while the adhesion between the particle crystals can be increased by either calcining or granulating and then calcining the particles, instead of simply drying the particles before use. Thus, the lithium-metal composite oxide prepared according to the present invention has not only a general granule size that can be used as an electrode active material, for example, a granule size of 0.1-100 μm, but also crystallographic stability and excellent electrochemical properties as a result of forming the uniform solid solution and improving the ordering of metal ions.

Particularly, when both the granulation process and the calcination process are performed, a stable crystal structure can be formed by achieving the growth and sintering of crystals and at the same time, a lithium-metal composite oxide having high density (tap density) can be obtained.

Figure 12:
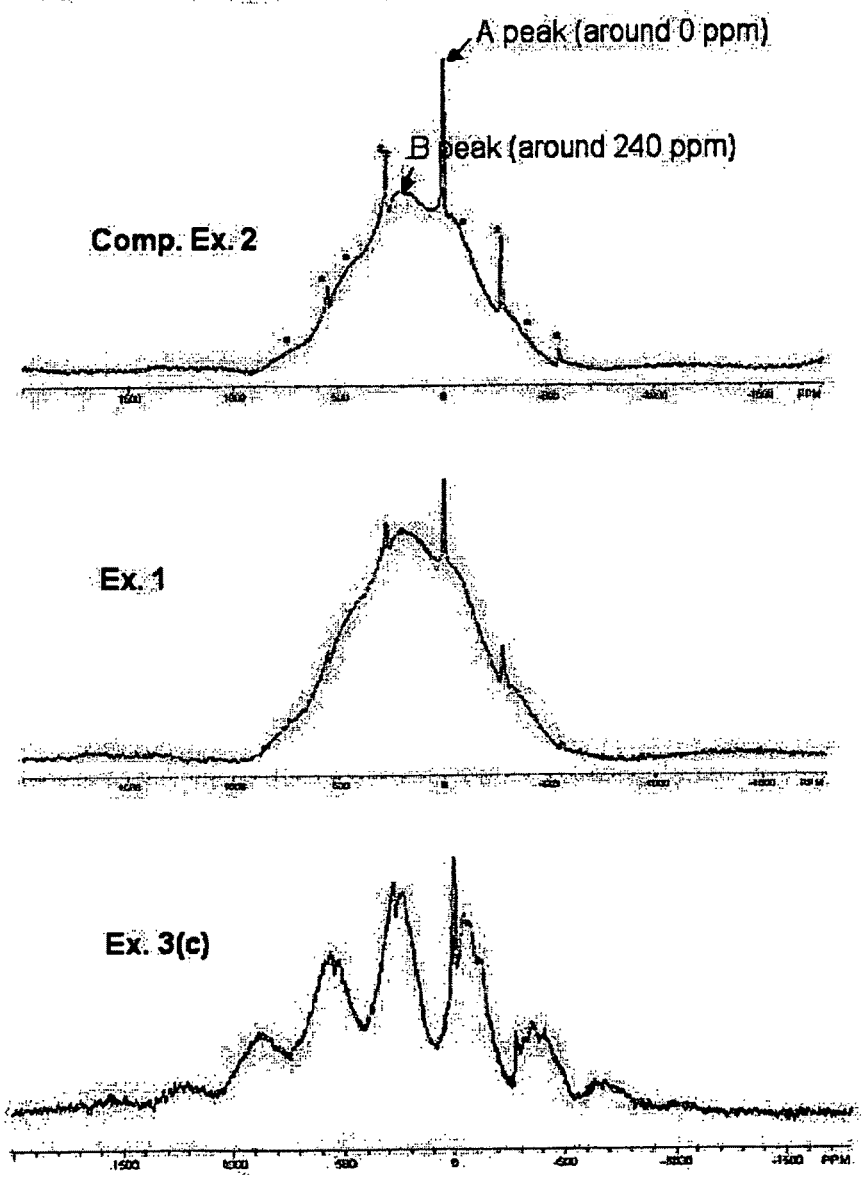
FIG. 12 is a graphic diagram showing the results of $^7$Li-NMR analysis of lithium-metal composite oxides ($LiNi_{1/3}Mn_{1/3}CO_{1/3}O_2$) synthesized in Example 1, Example 3(c) and Comparative Example 1.
Figure 13:
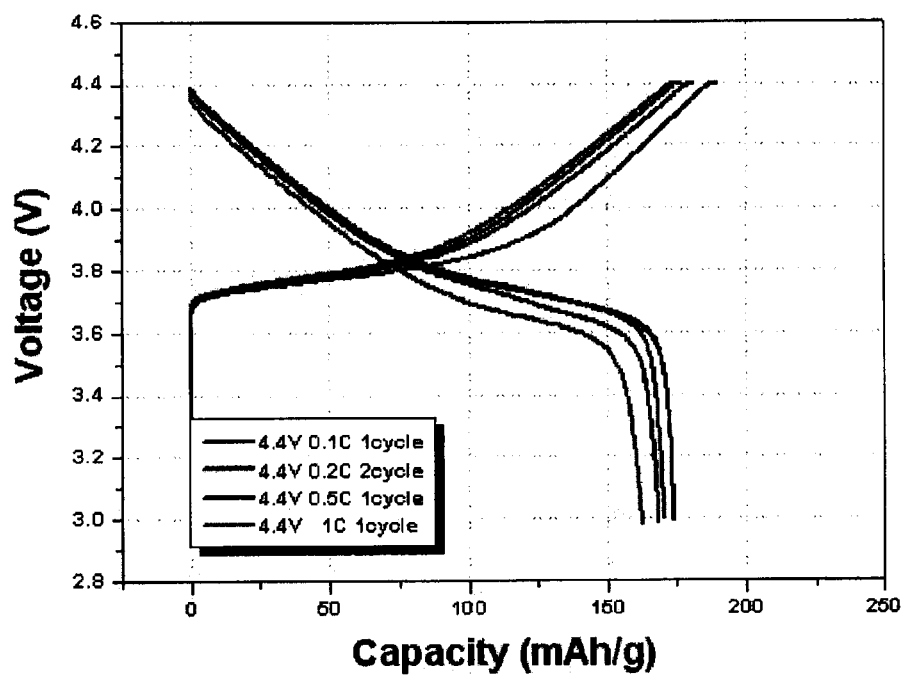
FIG. 13 is a charge/discharge graph of a lithium secondary battery, which comprises, as a cathode active material, a lithium-metal composite oxide ($LiNi_{1/3}Mn_{1/3}CO_{1/3}O_2$) synthesized in Example 3(c).
Figure 14:
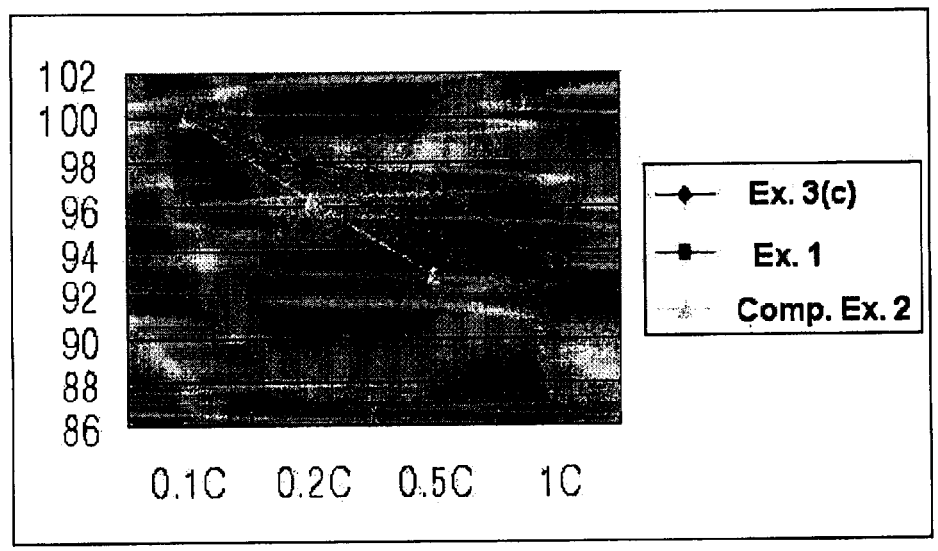
FIG. 14 is a graphic diagram showing the comparison of rate characteristics between lithium secondary batteries, which comprise, as a cathode active material, a lithium-metal composite oxide ($LiNi_{1/3}Mn_{1/3}Co_{1/3}O_2$) synthesized in each of Examples 1 and 3(c) and Comparative Example 2.

In fact, it was seen that the lithium-metal composite oxide ($LiNi_{1/3}Mn_{1/3}Co_{1/3}O_2$) prepared according to the novel preparation method of the present invention, and the lithium-metal composite oxide ($LiNi_{1/3}Mn_{1/3}Co_{1/3}O_2$) prepared according to the prior co-precipitation method, had different Li-NMR analysis data (see FIG. 12), and also showed slightly different battery characteristics when they were used in batteries (see FIGS. 13 and 14). This demonstrates that, unlike the lithium-metal composite oxide prepared according to the prior method, the lithium-metal composite oxide prepared according to the novel preparation method shows high capacity, high density and improved rate characteristics, because it has a metal-ordered structure in which the components thereof are uniformly distributed.

Also, the prior wet precipitation method such as the co-precipitation method requires at least 12-48 hours up to the production of a lithium-metal composite oxide precursor and also requires a sufficient heat treatment time for the diffusion of Li and the production of crystals, because the precursor contains no lithium component. In comparison with this, in the present invention, the lithium-metal composite oxide precursor can be formed within a few seconds at high temperature and high pressure. Moreover, a separate mixing process is not required, because the precursor already contains the lithium component before heat treatment. In addition, the heat treatment time for the diffusion of lithium and the production of a final active material can be shortened to promote an increase in the crystallinity of the lithium-metal composite oxide. In particular, when a material having small particle size, such as an olivine crystal structure-type lithium-metal composite oxide, is required, fine particles can be easily produced without carrying out the granulation process.

Furthermore, in the present invention, the decomposition of byproduct nitric acid occurs in supercritical reaction conditions, making wastewater treatment easy, because the lithium-metal composite oxide is synthesized using an alkalifying agent and a lithium precursor compound in supercritical or subcritical conditions, unlike the prior hydrothermal synthesis method and supercritical water hydrothermal method, which use expensive oxidizing agents.

The lithium-metal composite oxide of the present invention can be prepared on the basis of the hydrothermal synthesis method known in the art, which uses supercritical or subcritical water.

In a preferred embodiment of the present invention, the lithium-metal composite oxide can be prepared according a method comprising the steps of: (a) mixing an aqueous solution of one or more transition metal-containing precursor compounds with an alkalifying agent and a lithium precursor compound to precipitate a hydroxide of the transition metal; (b) mixing the mixture of step (a) with water under supercritical or subcritical conditions to synthesize a lithium-metal composite oxide; and (c) subjecting the lithium-metal composite oxide either to calcination or to granulation and then calcination. Herein, in order to distinguish the mixing processes in the step (a) and (b) from each other, the mixing processes will now be described as primary mixing and secondary mixing for convenience.

1) Step of mixing an aqueous solution of one or more transition metal-containing precursor compounds with an alkalifying agent and a lithium precursor compound This step is a step required for synthesizing a lithium-metal composite oxide having a uniform composition. In this step, hydroxides of transition metals other than lithium are precipitated in the form of ultrafine particles.

The transition metal-containing precursor compounds are not specifically limited as long as they are ionizable compound which contain transition metals. Preferred are water-soluble compounds. Herein, the transition metals preferably consist of a combination of paramagnetic metals (e.g., Ni, Mn, etc.) and diamagnetic metals (e.g., Co). Non-limiting examples of the transition metal precursor compounds include alkoxides, nitrates, acetates, halides, hydroxides, oxides, carbonates, oxlates or sulfates or combinations thereof, which all contain transition metals. Particularly, preferred are nitrates, sulfates, or acetates. Also, it is possible to use compounds containing either at least one of the above transition metals or combinations thereof, for example, Ni—Mn, Ni—Co, Ni—Mn—Co, etc.

The alkalifying agent serves to provide conditions in which one or more transition metal compounds are easily hydrolyzed and precipitated as hydroxides. The alkalifying agent is not specifically limited as long as it makes the reaction solution alkaline. Non-limiting examples of the alkalifying agent include alkali metal hydroxides (NaOH, KOH, etc.), alkaline earth metal hydroxides ($Ca(OH)_2$, $Mg(OH)_2$, etc.), ammonia compounds (ammonia water, ammonium nitrate, etc.), and mixtures thereof. Particularly preferred is a case where the metal compound is nitrate, and the alkalifying agent is an ammonia compound. This is because nitrate ions produced as byproducts are mostly decomposed in the same process, and the remaining ions are also easily removed by washing, drying or calcination in subsequent processes.

As the lithium precursor compound, any compound can be used without any particular limitation as long as it is a water-soluble salt that contains lithium and is ionizable. Non-limiting examples thereof include lithium nitrate, lithium acetate, lithium hydroxide, and lithium sulfate. Particularly, lithium hydroxide is preferred, because it serves not only as a lithium source, but also to increase alkalinity.

The process of mixing the alkalifying agent and the lithium precursor compound can be performed by mixing both the alkalifying agent and the lithium precursor solution with water. Alternatively, it can be performed by mixing the alkalifying agent with water and then adding the lithium precursor compound thereto. Alternatively, it can be performed by mixing the alkalifying agent with the lithium precursor compound and then adding the mixture to water.

In the mixing process of step (a), the transition metal hydroxides should be precipitated in the form of fine particles, whereas the lithium hydroxide should be present in a state dissolved in aqueous solution. Thus, the temperature and pressure in the mixing process should avoid subcritical or supercritical conditions, such that the precipitation of the lithium compound does not occur.

(b) Step of adding water under supercritical or subcritical conditions to the mixture of step (a) and performing secondary mixing In this step, lithium ions present in the aqueous solution react with supercritical or subcritical water, so that ultrafine particle crystals of lithium-metal composite oxide are synthesized, in which lithium ions are inserted into the precipitated transition metal fine particles.

In the process of step (b), the reaction pressure and temperature should be suitable either for allowing the metal hydroxide precipitate produced in the step (a) to react with lithium ions in the aqueous solution, or allowing lithium ions in the aqueous solution to precipitate as hydroxides. For reference, hydroxides of alkali metals, such as lithium, sodium and potassium, have high solubility in water at ambient temperature and atmospheric pressure, but when the density of water is decreased due to high-temperature and high-pressure conditions, the hydroxides show a marked decrease in the solubility thereof in water. For example, the solubility of KOH in water is 2.6 mol (145.8 g/100 g water) in conditions of ambient temperature, atmospheric pressure water density of 1.0 g/cm', but is decreased to 300 ppm in conditions of temperature of 424° C., water density of 0.139 g/cm' and pressure of 262 bar (W. T. Wofford, P. C. Dell'Orco and E. F. Gloyna, J. Chem. Eng. Data, 1995, 40, 968-973). Accordingly, in order to significantly reduce the solubility of the lithium hydroxide, and thus to promote a reaction for synthesizing a lithium-metal composite oxide, supercritical or subcritical water should be added and mixed. As used herein, the term "supercritical or subcritical water means high-temperature and high-pressure water having a pressure of 180-550 bar and a temperature of 200-700° C. When the precipitated transition metal hydroxides and the lithium aqueous solution are instantaneously mixed with high-temperature water, the temperature of the mixture will rapidly increase from ambient temperature to subcritical or supercritical temperatures. It is required to continuously maintain supercritical or subcritical conditions even after adding supercritical or subcritical water.

As described above, the lithium ions subjected to the secondary mixing process meet high-temperature and high-pressure water, so that they are synthesized into lithium-metal composite oxide or precipitated as fine lithium hydroxide. Because the precipitated lithium hydroxide has little chance to contact with the transition metal hydroxides, some thereof do not participate in the reaction, are discharged in conditions of ambient pressure and atmospheric pressure, are dissolved again in the discharged solution at ambient temperature and atmospheric pressure, and are wasted in the form of an aqueous solution. For this reason, lithium should be added in an excess amount in consideration of an amount which is discharged without participating in the reaction. To satisfy the above-described amount of lithium, the molar ratio of Li to transition metals (e.g., Ni+Mn+Co) is preferably 1.0-20, and more preferably 1.0-10. If the molar ratio of Li/(Ni+Mn+Co) is excessively low, lithium will participate in the reaction in an amount smaller than the stoichiometric ratio for forming a lithium-metal composite oxide, and thus impurities such as transition metal oxides unreacted with lithium, for example, cobalt oxide, cobalt oxide or manganese oxide, will occur, thus reducing the purity of the desired material. If the ratio is excessively high, Li in excess of the stoichiometric ratio will remain and should be recovered or wasted from a discharged solution, leading to a decrease in economic efficiency.

The alkali equivalent ratio of the mixture of step (b) is preferably 1-10, but the scope of the present invention is not limited thereto. As used herein, the term "alkali equivalent ratio" is defined as the ratio of the number of equivalents of hydroxyl ions coming from the alkalifying agent (e.g., ammonia water) and LiOH to the number of equivalents of acidic groups ($NO_3$, $SO_4$) coming from the transition metal precursor compounds (e.g., $Co(NO_3)_2$, $Ni(SO_4)$, $Mn(NO_3)_2$, etc.) and the lithium precursor compound (e.g., $LiNO_3$). For example, it is defined as $([NH_3]+[OH])/([NO_3]+2[SO_4])$. If the alkali equivalent ratio is excessively low, the product will contain impurities (e.g., $CO_3O_4$), and if it is excessively high, the alkaline content of waste water will be excessively increased.

In the preparation method according to the present invention, the mixing process of step (a) is preferably carried out in a mixer (a mixer 1 in FIG. 1; a first mixer), and more preferably a continuous mixer. Also, the second mixing step is preferably carried out in a continuous mixer (a mixer 2 in FIG. 2; a second mixer) such as a tube-type mixer. Thus, a uniform precipitate of transition metal hydroxides is formed in the first mixer (the mixer 1 in FIG. 1), and when the lithium hydroxide present in the mixture in the first mixer is mixed and reacts with supercritical or subcritical water in the continuous-type second mixer (the mixer 2 in FIG. 2; the second mixer) and a reactor, which are connected with the first mixer, a lithium-metal composite oxide is synthesized, in which lithium ions are inserted into the previously precipitated transition metal hydroxides.

(C) Step of drying the obtained lithium-metal composite oxide and then subjecting the dried oxide to calcination or granulation/calcination The lithium-metal composite oxide produced in the step (b) is very fine such that it is not suitable for use as a cathode active material in lithium secondary batteries. Thus, this step is performed to make granules having a size suitable for use as a cathode active material. For reference, it is known that a cathode active for lithium secondary batteries preferably has a granule size of about 0.1-100 μM (medium value: 2-20 μm).

The granulation process can be generally carried out simultaneously with drying using various methods known in the art, including a spray drying method, a fluidized bed drying method and a vibration drying method. The spray drying method is particularly preferred, because it can increase the tap density of granules through the preparation of spheres. Before the concentrate is dried and at the same time, granulated, it can be washed with clean water to remove impurity salts (e.g., $NH_4NO_3$ salt), ionic impurities (e.g., $NO_3^-$ and $SO_4^{2-}$ decomposed from nickel compounds, manganese compounds and cobalt compounds), which can remain in the concentrate.

The calcination process acts to grow lithium-metal oxide particles and to increase the adhesion between the particles. Thus, the calcination process can be carried out either immediately after the step (b) or the granulation process. It is particularly preferable to carry out the granulation process and then the calcination process, because in this case the primary particles of the granules grow and at the same time, are provided with crystallographic stability. If the calcination process is not performed, crystals will not be stabilized, leading to a great deterioration in the initial cycle performance of batteries. This deterioration is the breakdown phenomenon of an unstabilized surface, which frequently appears in $LT-LiCoO_2$, etc. Also, if the calcination process is not performed, the electrode active material will have large specific surface area, low tap density, and thus low capacity per volume.

The calcination temperature is preferably in the range of 600-1200° C., but there is no particular limitation on the calcination temperature. If the calcination temperature is lower than 600° C., the growth of the primary particles will not be sufficient, the sintering between the primary particles will not substantially occur, and thus the primary particles will have large specific surface area and low tap density. In addition, the growth of the crystals will be insufficient, and the composite oxide is not sufficiently stabilized, leading to a reduction in the cycle characteristics of batteries. If the calcination temperature is higher than 1200° C., the sintering between the primary particles will be excessive, thus reducing the performance of the particles as cathode active materials.

Before, after or during any step of the steps (a) to (c), it is possible to add at least one additive selected from among a binder, a sintering aid, a doping agent, a coating agent, a reducing agent, an oxidizing agent, acid, carbon or a carbon precursor, metal oxide and a lithium compound. Particularly, the preparation of a lithium-metal composite oxide having an olivine-type crystal structure, for example, $LiFePO_4$, can be prepared through suitable use of phosphoric acid, carbon or a carbon precursor, sucrose, etc., during the preparation process thereof.

The binder can be used to make the granules spherical and to improve particle size distribution, and non-limiting examples thereof include water, ammonia water, PVA (polyvinyl alcohol), and mixtures thereof. The sintering agent can be used during the high-temperature calcination of the granules to reduce the calcination temperature or to increase the calcination density, and non-limiting examples thereof include metal oxides, such as alumina, $B_2O_3$ and MgO, or precursors thereof, and Li compounds such as LiF, LiOH and $LiCO_3$. The doping agent and the coating agent are used to coat the outer surface of electrode active material crystals with metal oxide ultrafine particles in order to increase the durability of the calcined material, when the calcined material is used in batteries. Non-limiting examples thereof include metal oxides, such as alumina, zirconia, titania and magnesia, or precursors thereof.

A lithium-metal composite compound having an olivine-type crystal structure can be doped with a metal such as Mn in order to increase the electrical conductivity thereof. The oxidizing agent or the reducing agent can be used to control each of the steps to a reducing or oxidative atmosphere. Non-limiting examples of the reducing agent include hydrazine, oxalic acid, sucrose, fructose, ascorbic acid, Vitamin C, hydrogen, carbon, hydrocarbon, or mixtures thereof. Non-limiting examples of the oxidizing agent include oxygen, hydrogen peroxide, ozone, or mixtures thereof. The acid is used in the form of a reaction material, such as a phosphoric acid compound or a sulfuric acid compound. Non-limiting examples of the acid include phosphoric acid, sulfuric acid or a mixture thereof. The carbon or the carbon precursor can be used to increase the electrical conductivity of the prepared material by coating the surface of the material with it or to provide a reducing atmosphere. It is particularly useful for a lithium-metal composite compound having an olivine-type crystal structure. The lithium compound can participate in the reaction during the calcination step to increase the "a" value of a synthesized lithium-metal composite oxide, for example, $Li_{1+a}[Ni_xMn_yCo_z]M_bO_{2-b}$, and non-limiting examples thereof include Li compounds, such as LiF, LiOH, $LiNO_3$ and $LiCO_3$.

In another aspect, the present invention provides lithium-metal composite oxides prepared according to the above-described preparation method.

When the preparation method according to the present invention is used to prepare a multicomponent metal composite oxide comprising at least two metal components in addition to lithium, the metal components can be uniformly mixed and arranged in the crystal structure of the composite oxide, thus showing an improved ordered structure.

A change in physical properties, such as metal ordering in the crystal structure of the lithium-metal composite oxide, can be observed by Li-NMR (see FIG. 12 and Table 3).

In Li-NMR, when a strong magnetic field is externally applied to a lithium-containing material, chemical shift values will be shifted due to various interactions between a lithium nucleus having a magnetic moment and the unpaired electrons of components contained in the lithium-containing material, and the structural characteristics (e.g., clustering, metal ordering) of a specific metal in the crystal structure of the lithium-containing material can be assessed by measuring various changes, such as peak intensity and line width, caused by such chemical shift values.

The present invention can provide a multicomponent (binary or higher) lithium metal composite oxide comprising paramagnetic and diamagnetic metals, the composite oxide satisfying any one of the following conditions: (1) the ratio of intensity between a main peak of 0±10 ppm ($I_{0ppm}$) and a main peak of 240±140 ppm ($I_{240ppm}$), ($I_{0ppm}/I_{240ppm}$), is less than 0.117·Z wherein Z is the ratio of moles of the diamagnetic metal to moles of lithium; (2) the ratio of line width between the main peak of 0±10 ppm ($I_{0ppm}$) and the main peak of 240±140 ppm ($I_{240ppm}$), ($W_{240ppm}/W_{0ppm}$), is less than 21.45; and (3) both the conditions (a) and (b), the peaks being obtained according to $^7$Li-NMR measurement conditions and means as described below.

Preferably, the multicomponent lithium-metal composite oxide according to the present invention satisfies any one of the following conditions: (1) the ratio of intensity between the main peak of 0±10 ppm ($I_{0ppm}$) and the main peak of 240±140 ppm ($I_{240ppm}$), ($I_{0ppm}/I_{240ppm}$), is less than 0.039; (2) the ratio of line width between the main peak of 0±10 ppm ($I_{0ppm}$) and the main peak of 240±140 ppm ($I_{240\ ppm}$), ($W_{240ppm}/W_{0ppm}$), is 20.30 or less; and (3) both the conditions (a) and (b). More preferably, the multicomponent lithium-metal composite oxide according to the present invention satisfies any one of the following conditions: (1) the ratio of intensity between the main peak of 0±10 ppm ($I_{0ppm}$) and the main peak of 240±140 ppm ($I_{240ppm}$), ($I_{0ppm}/I_{240ppm}$), is 0.021 or less; (2) the ratio of line width between the main peak of 0±10 ppm ($I_{0ppm}$) and the main peak of 240±140 ppm ($I_{240ppm}$), ($W_{240ppm}/W_{0ppm}$), is 15.31 or less; and (3) both the conditions (a) and (b).

[Measurement Conditions]

300 MHz solid state NMR system;

MAS spinning rate: 32 kHz;

Spectral frequency: 116.6420 MHz;

Temperature: room temperature (25° C.);

Chemical shift value standard: 1M LiCl in $H_2O$;

Pulse sequence: spin echo (90°–τ1–180°–τ2);

Spectrum width: 500,000 Hz;

Pulse length: 90° pulse length –2.25 μsec, and 180° pulse length –4.50 μsec;

Dwell time (τ1): 31.25 μsec; and

Pulse delay: 2 sec.

As the paramagnetic and diamagnetic metals, metals known in the art can be used in the present invention without any particular limitation on the components or contents thereof as long as they show paramagnetic and diamagnetic properties. As used herein, the term "paramagnetic metal" refers to a metal having unpaired electrons in the atom, and the term "diamagnetic metal" refers to a metal in which all electrons in the atom are paired. Non-limiting examples of the paramagnetic metal include nickel (Ni), manganese (Mn), and combinations thereof, and non-limiting examples of the diamagnetic metals include cobalt (Co).

A lithium-metal composite oxide, which can be provided according to the present invention, can be represented by any one of the following formulas 1 to 4, but the scope of the present invention is not limited thereto:

$$Li_{1+a}A_{1-x}C_xO_{2-b}X_b (-0.5 \leq a \leq +0.5, 0 \leq b \leq +0.1, 0 \leq x \leq +0.1)$$ [Formula 1];

$$Li_{1+a}A_xB_{2-x-y}C_yO_{4-b}X_b (-0.5 \leq a \leq +0.5, 0 \leq b \leq +0.1, 0 \leq x \leq +2, 0 \leq y \leq 0.1)$$ [Formula 2];

$$Li_{1+a}A_{1-x}C_x(YO_{4-b}X_b)(-0.5 \leq a \leq +0.5, 0 \leq b \leq +0.1, 0 \leq x \leq +0.1)$$ [Formula 3];

$$Li_{1+a}A_{2-x}C_x(YO_{4-b}X_b)_3 (-0.5 \leq a \leq +0.5, 0 \leq b \leq +0.1, 0 \leq x \leq +0.1)$$ [Formula 4], wherein A is at least one element selected from among transition metals having a six-coordinate structure;
B is at least one element selected from among transition metals having a four-coordinate structure;
C is at least one element selected from the group consisting of alkaline earth metals and Group 3B elements;
X is at least one element selected from the group consisting of Groups 5B, 6B and 7B elements; and
Y is at least one element selected from metalloids or metals having a four-coordinate structure.

In the lithium-metal composite oxide of the present invention, it is easy to mix elements with each other, and thus it is easy to perform the substitution and addition of other elements for improving electrochemical properties. For example, the transition metal site in the active materials represented by the formulas 1 to 4 can be doped with trace amounts of other elements selected from among alkaline earth metals and Group 3B elements. Also, the oxygen site in the active materials can be easily substituted with an element selected from among Groups 5B, 6B and 7B, having strong electron affinity.

With respect to the transition metals, those having a six-coordinate structure are generally stable, but in a spinel structure such as the above formula 2 may have four-coordinate and six-coordinate structures. Thus, in the above formula 1, A having a six-coordinate structure may be Ni, Mn or Co, and in the above formula 2, B having a four-coordinate structure and A having a six-coordinate structure may be Ni, Mn or Co. Also, in the formula 3 or 4, A having a six-coordinate structure may be Fe, Mn, Co, Ni or V, and Y having a four-coordinate structure may be P, Ti, V or Si. Moreover, in the formulas 1 to 4, C may be Al or Mg, and X may be F, S or N. However, the scope of the present invention is not limited thereto.

In the above formulas 1 to 4, the range of "a" is $-0.5 \leq a \leq +0.5$. If "a" is less than −0.5, the crystallinity of the resulting oxide will not be sufficient, and if "a" exceeds 0.5, excess Li will be present in the resulting oxide to form impurities such as $Li_2CO_3$, which can deteriorate the performance and stability of batteries.

Non-limiting examples of the above-described lithium-metal composite oxide include $LiNi_{1/3}Mn_{1/3}Co_{1/3}O_2$, $LiNi_{1/2}Mn_{1/2}O_2$, $LiNi_{0.8}Co_{0.2}O_2$, $LiNi_{0.8}Al_{0.05}Co_{0.15}O_2$, $LiNi_{0.5}Mn_{1.5}O_4$, $LiFePO_4$, $LiMn_2O_4$, $LiCoO_2$, $Li_{1+a}Ni_x Co_yO_2$ ($-0.5<a<0.5$, $0<x<1$, $0<y<1$), $LiM_2O_4$ (M=a transition metal, for example, Ni, Mn, Co, Ti, Fe, V, etc.), and $LiMPO_4$ (M=a transition metal, for example, Ni, Mn, Co, Ti, Fe, V, etc.). In addition, lithium-metal composite oxides known in the art are also within the scope of the present invention.

The lithium-metal composite oxide according to the present invention is preferably in the form of circular granules, but there is no particular limitation on the form thereof. Herein, the size of the granules is preferably in the range of 0.1-100 μm, but the scope of the present invention is not limited thereto. If the size of the granules is less than 0.1 μm, they will have an excessively large specific surface area, which makes not easy to fabricate an electrode, and if the size of the granules exceeds 100 μm, the thickness uniformity of a thin layer during the fabrication of an electrode can be deteriorated, resulting in an inferior battery. It is possible to adjust the shape, size and size distribution of the granules within the range where the composite oxide shows structural stability and excellent physical properties (tap density, packing density, etc.).

Also, a prior electrode active material generally shows an improvement in the rate characteristics of a battery with a decrease in the grain size thereof, whereas the lithium-metal composite oxide of the present invention exhibits excellent rate characteristics, even though it has a grain size significantly larger than that of the lithium-metal composite oxide prepared according to the prior co-precipitation method (see Table 4 and FIG. 14). Moreover, the lithium-metal composite oxide of the present invention has advantages in that it easily improve the rate characteristics of a battery by controlling the grain size thereof and that an increase in the grain size of the grains leads to an increase in the tap density and packing density thereof (see Tables 2 and 4). Herein, the tap density of the lithium-metal composite oxide of the present invention is preferably higher than 1.8 g/cm³, but there is no particular limitation on the tap density.

In still another aspect, the present invention provides an electrode, preferably a cathode, comprising the above-described lithium-metal composite oxide.

The electrode according to the present invention can be fabricated according to any conventional method known in the art. In one embodiment, the electrode can be manufactured by mixing the lithium-metal composite oxide as an active material for both electrodes, preferably a cathode active material, with a binder, so as to prepare an electrode slurry, and coating the prepared electrode slurry on a current collector. In this case, a conducting agent can optionally be used.

In still another aspect, the present invention provides an electrochemical device comprising: (a) a cathode comprising the above-described lithium-metal composite oxide; (b) an anode; (c) a separator; and (d) an electrolyte.

The electrochemical devices include all devices that perform electrochemical reactions, and specific examples thereof include all kinds of primary and secondary batteries, fuel cells, solar cells, and capacitors. Among the secondary batteries, preferred are lithium secondary batteries, including lithium metal secondary batteries, lithium ion secondary batteries, lithium polymer secondary batteries and lithium ion polymer secondary batteries.

The electrochemical device of the present invention can be fabricated according to any conventional method known in the art. In one embodiment, the electrochemical device can be fabricated by interposing a porous separator between the cathode and the anode within a battery case and then injecting the electrolyte into the battery case.

There is no particular limitation on the anode, the electrolyte and the separator, which are to be applied together with the cathode of the present invention, and it is possible to use those which have been conventionally used in prior electrochemical devices.

BEST MODE FOR CARRYING OUT THE INVENTION

Hereinafter, the present invention will be described in further derail with reference to examples and comparative examples. It is to be understood, however, that these examples are illustrative only and the scope of the present invention is not limited thereto.

Example 1

1-1: Preparation of Lithium-Metal Composite Oxide Granules (LiNi$_{1/3}$Mn$_{1/3}$Co$_{1/3}$O$_2$)

Figure 2:
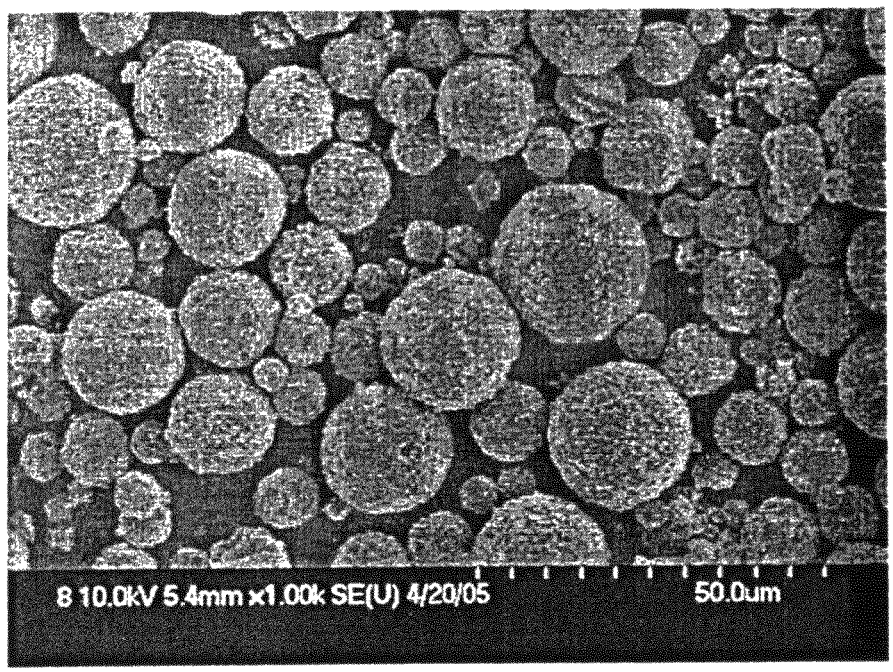
FIG. 2 is a SEM photograph of a lithium-metal composite oxide ($LiNi_{1/3}Mn_{1/3}Co_{1/3}O_2$) synthesized according to Example 1. (a): after drying; and (b): after calcination.
Figure 2:
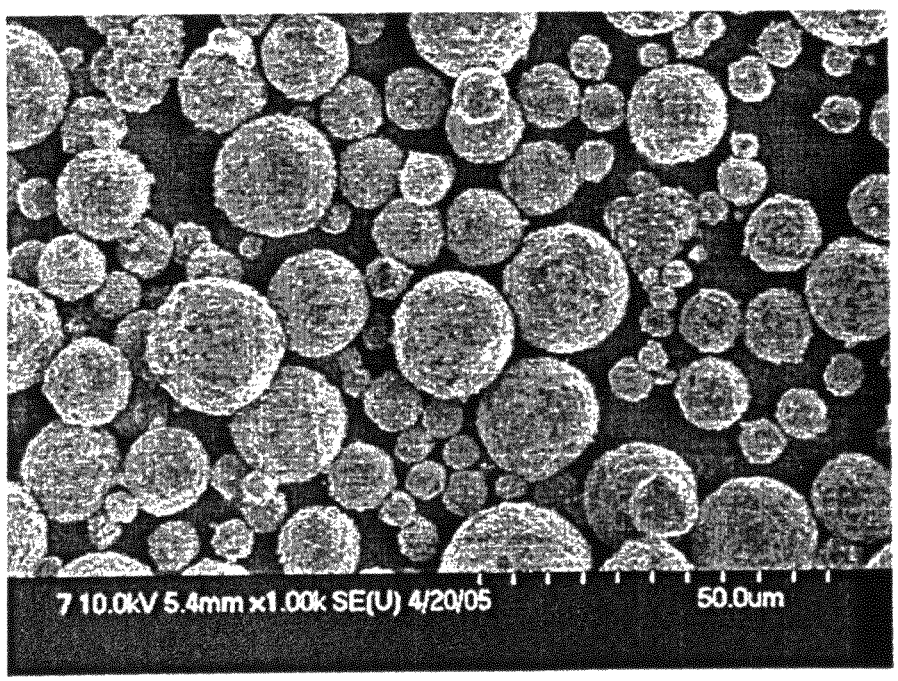
Figure 3:
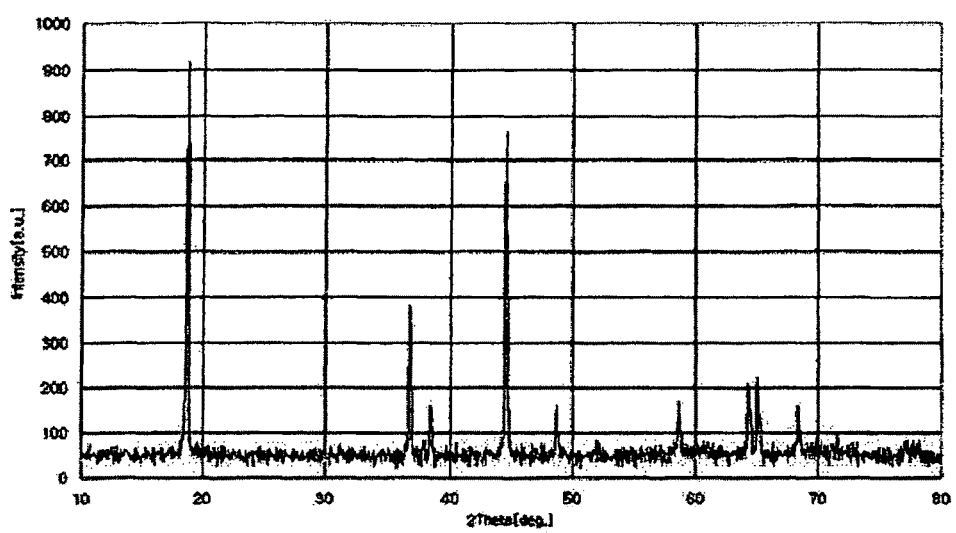
FIG. 3 is an XRD graph of a lithium-metal composite oxide ($LiNi_{1/3}Mn_{1/3}Co_{1/3}O_2$) synthesized according to Example 1.

FIG. 1 schematically shows a process for preparing lithium-metal composite oxide granules according to the present invention.

An aqueous solution containing 7.0 parts by weight of cobalt nitrate (Co(NO$_3$)$_2$.6H$_2$O), 7,0 parts by weight of nickel nitrate (Ni(NO$_3$)$_2$.6H$_2$O) and 6.9 parts by weight of manganese nitrate (Mn(NO$_3$)$_2$.6H$_2$O) was pumped under pressure at a rate of 8 ml/min in conditions of room temperature and pressure of 250 bar, and a mixture solution containing 13.2 parts by weight of ammonia (NH$_3$) water and 12.1 parts by weight of aqueous lithium hydroxide (LiOH) solution was pumped under pressure at a rate of 8 ml/min in conditions of room temperature and pressure of 250 bar, such that the solutions met each other in a first mixer. Herein, the NH$_3$/NO$_3$ molar ratio was 1.5, and the Li/(Ni$^+$ Mn+Co) molar ratio was 4. To the mixture, ultrapure water heated to about 450° C. was pumped under pressure at a rate of 96 ml/min at a pressure of 250 bar, such that it met the mixture in a second mixer. The resulting mixture was allowed to reside in a reactor at 400 for 7 seconds, and then cooled and concentrated. The concentrate was dried using a spray dryer at 120° C. while it was granulated. The granules were calcined in an oxidation furnace at 1000° C. for 6 hours, thus obtaining a lithium-metal composite oxide (LiNi$_{1/3}$Mn$_{1/3}$CO$_{1/3}$O$_2$). The specific surface area and tap density of the prepared lithium-metal composite oxide (LiNi$_{1/3}$Mn$_{1/3}$Co$_{1/3}$O$_2$) are shown in Table 2 below.

1-2. Fabrication of Cathode and Battery

The lithium-metal composite oxide prepared in Example 1-1 was used as a cathode active material. The cathode active material, a conducting agent and a binder were mixed with each other at a weight ratio of 95:2.5:2.5 in a solvent, thus preparing a cathode slurry. The cathode slurry was applied and dried on an aluminum foil, thus obtaining a cathode electrode.

An electrolyte was prepared by dissolving 1 mole of LiPF$_6$ in a mixed solvent of EC (ethylene carbonate) and EMC (ethyl methyl carbonate) (1:2 (v/v)). A coin-type battery was fabricated using the above-prepared cathode and electrolyte.

Example 2

Lithium-metal composite oxide granules, a cathode comprising the granules, and a lithium secondary battery comprising the cathode, were prepared in the same manner as in Example 1, except that the NH$_3$/NO$_3$ molar ratio was changed from 1.5 to 3.0.

Figure 4:
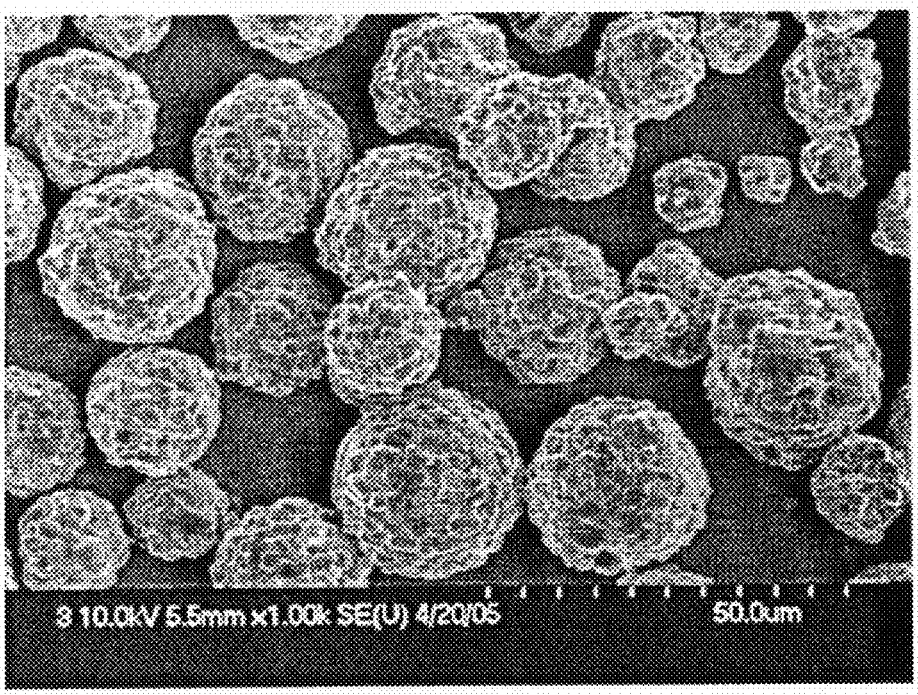
FIG. 4 is an SEM photograph of a lithium-metal composite oxide ($LiNi_{1/3}Mn_{1/3}Co_{1/3}O_2$) synthesized according to Example 2. (a): after drying; and (b): after calcination.
Figure 4:
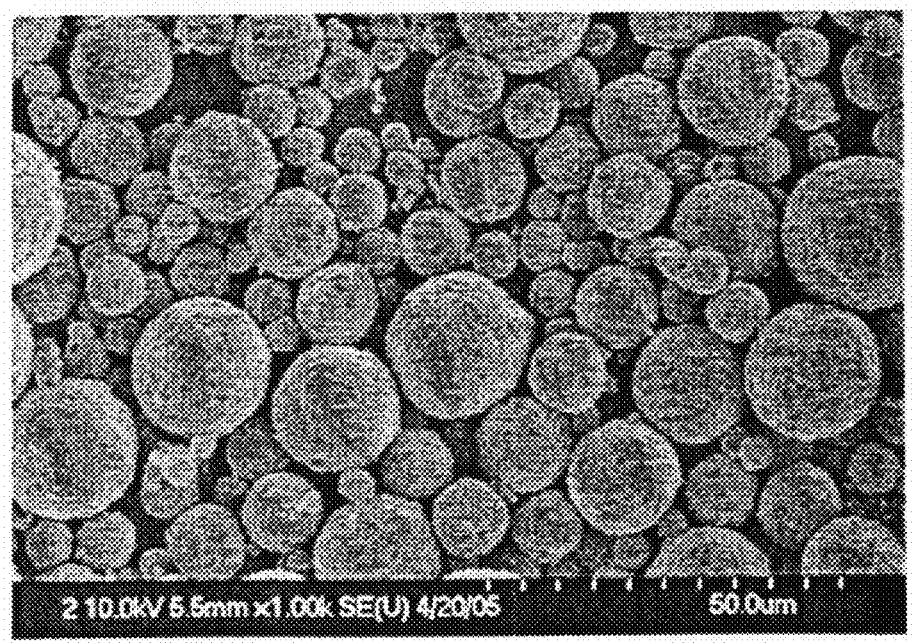
Figure 5:
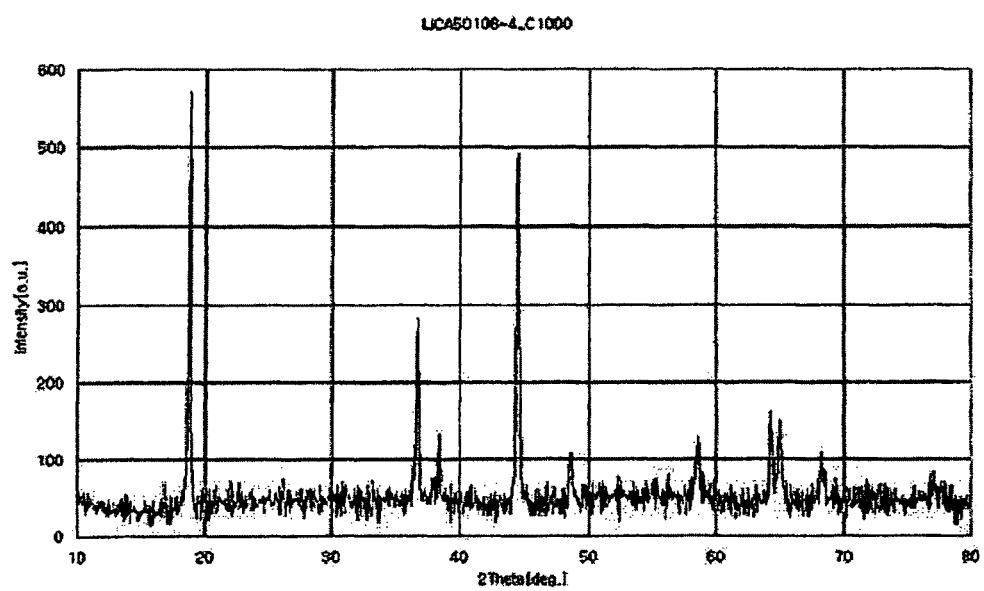
FIG. 5 is an XRD graph of a lithium-metal composite oxide synthesized according to Example 2.

As shown in FIG. 4(a), the spray-dried granules were in the form of spheres having a size of about 10-30 μm, and as shown in FIG. 4(b), these granules maintained the shape thereof even after calcination.

Examples 3(a) to 3(c)

The concentrate synthesized in Example 1 was washed with clean water to remove the removing ions, and then LiOH was added in an aqueous solution in each of amounts of 0.0 moles (Example 3(a)), 0.10 moles (Example 3(b)) and 0.30 moles (Example 3(c)) per mole of the synthesized lithium-metal composite oxide. Then, each of the mixtures was dried using a spray dryer at a temperature of 120° C. and at the same time, granulated. The granules were calcined in an oxidation furnace at 1000° C. for 6 hours, thus obtaining lithium-metal composite oxide granules (Li[Ni$_{1/3}$Mn$_{1/3}$Co$_{1/3}$]O$_2$).

Figure 6:
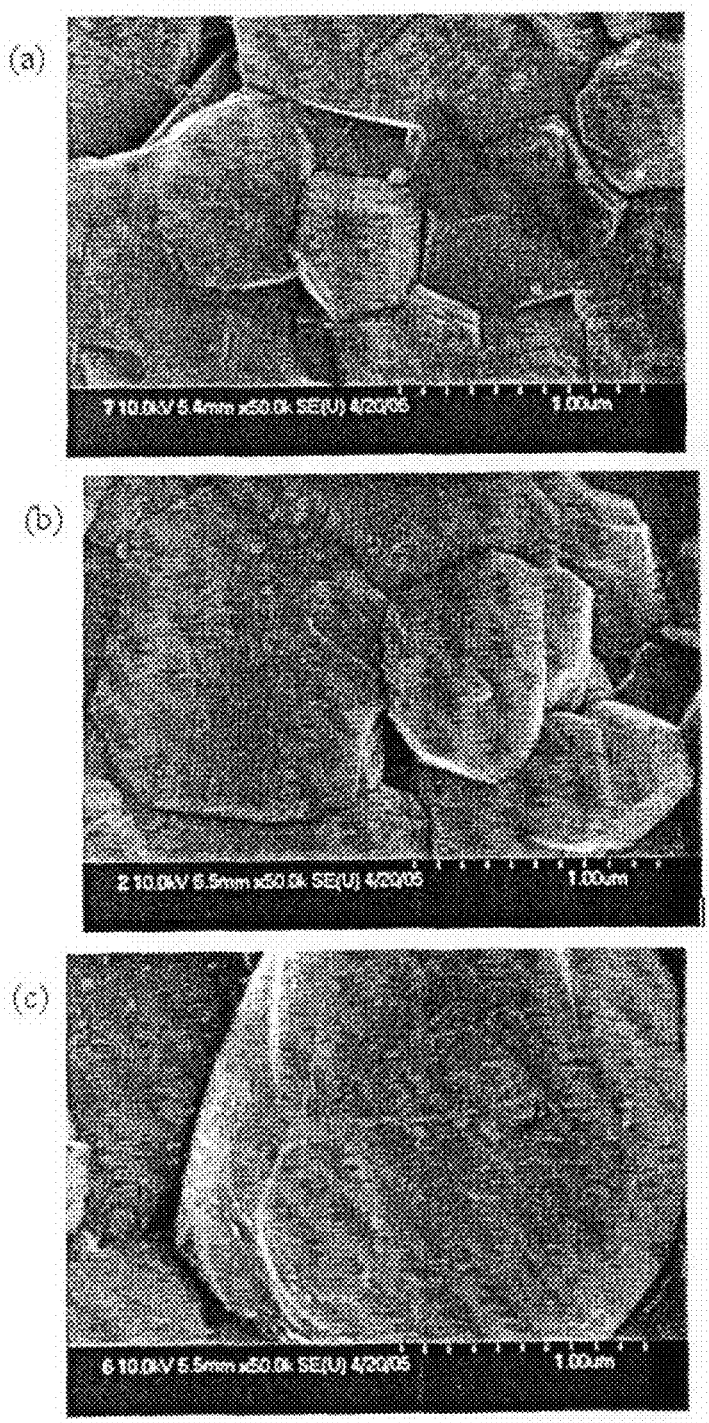
FIGS. 6(a) to 6(c) are SEM photographs of lithium-metal composite oxides ($LiNi_{1/3}Mn_{1/3}CO_{1/3}O_2$) synthesized according to Examples 3(a) to 3(c), respectively.

The dried samples and the calcined samples were analyzed with respect to their size, shape (SEM), specific surface area (BET) and tap density. FIGS. 6(a) to 6(c) show FESEM images of the spray-dried granules. As shown in FIGS. 6(a) to 6(c), the size of the primary particles of the granules was increased with an increase in the amount of addition of LiOH. Also, the addition of LiOH led to an increase in tap density.

Examples 4(a) to 4(c)

Figure 7:
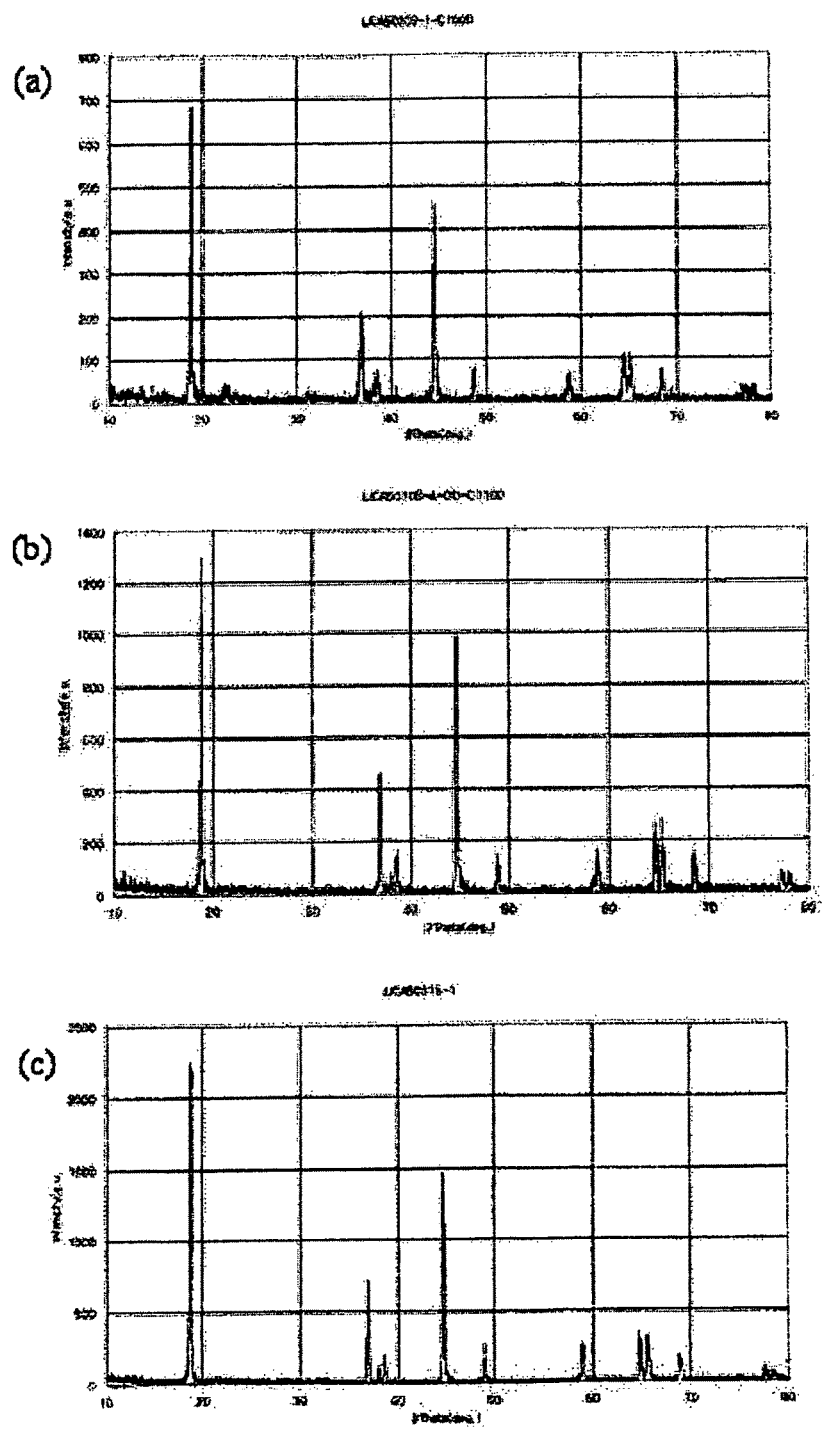
FIGS. 7(a) to 7(c) are XRD graphs of lithium-metal composite oxides synthesized according to Example 4(a) to 4(c), respectively.
Figure 8:
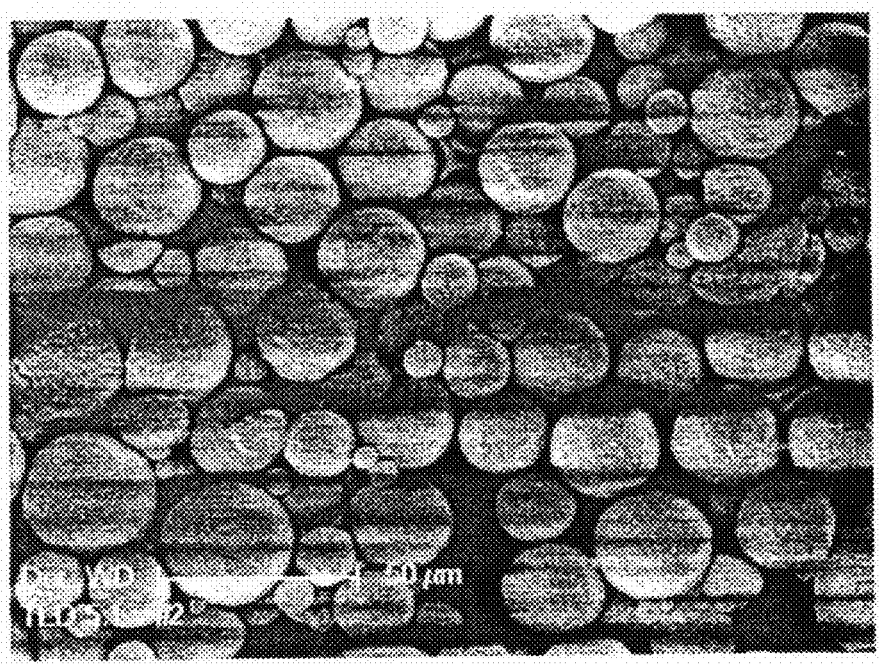
FIG. 8(a) is an FESEM photograph of a lithium metal composite oxide ($LiNi_{1/2}Mn_{1/2}O_2$) synthesized in Example 5.
FIG. 8(b) is an XRD graph of the composite oxide synthesized in Example 5.
Figure 8:
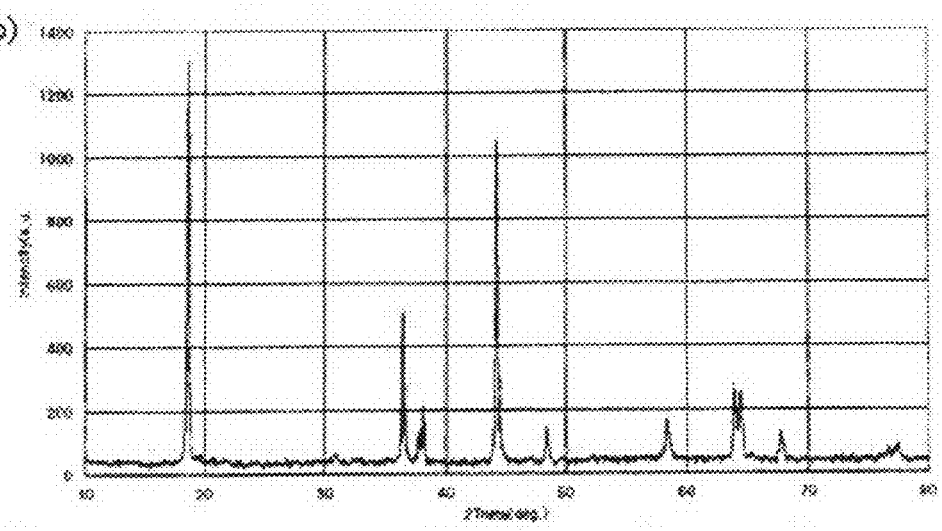

Lithium-metal composite oxide granules (Li[Ni$_{1/3}$Mn$_{1/3}$CO$_{1/3}$]O$_2$), cathodes comprising the granules, and lithium secondary batteries comprising each of the cathodes, were prepared in the same manner as in Example 1, except that the residence time in the reactor was changed from 7 seconds to each of 12 seconds (Example 4(a)), 30 seconds (Example 4(b)) and 60 seconds (Example 4(c)). XRD images of the synthesized granules are shown in FIGS. 7(a) to 7(c).

Example 5

Lithium-metal composite oxide granules (Li[Ni$_{1/2}$Mn$_{1/2}$]O$_2$), cathodes comprising the granules, and lithium secondary batteries comprising each of the cathodes, were prepared in the same manner as in Example 1, except that an aqueous solution containing 10.6 parts by weight of nickel nitrate and 10.4 parts by weight of manganese nitrate was used instead of the aqueous solution containing 7.0 parts by weight of cobalt nitrate, 7,0 parts by weight of nickel nitrate and 6.9 parts by weight of manganese nitrate. Changes in the specific surface area and tap density of the prepared active materials before and after the calcination are shown in Table 2 below.

Example 6

An aqueous solution containing 20.9 parts by weight of cobalt nitrate (Co(NO$_3$)$_2$.6H$_2$O) was pumped under pressure at a rate of 8 ml/min in conditions of room temperature and pressure of 250 bar, and a mixture solution containing 13.2 parts by weight of ammonia (NH$_3$) water and 12.1 parts by weight of aqueous lithium hydroxide (LiOH) solution was pumped under pressure at a rate of 8 ml/min in conditions of room temperature and pressure of 250 bar, such that the solutions met each other in a first mixer. Herein, the NH$_3$/NO$_3$ molar ratio was 1.5, and the Li/Co molar ratio was 4. To the mixture, ultrapure water heated to about 450° C. was pumped under pressure at a rate of 96 ml/min at a pressure of 250 bar, such that it met the mixture in a second mixer. The resulting mixture was allowed to reside in a reactor at 400° C. for 7 seconds, and then cooled and concentrated. The concentrate was dried using a spray dryer at 120° C., and then calcined in an oxidation furnace at 800° C. for 6 hours, thus obtaining a lithium-metal composite oxide ($LiCoO_2$). Also, a cathode comprising the lithium-metal composite oxide ($LiCoO_2$) and a lithium secondary battery comprising the cathode were fabricated.

Example 7

Figure 17:
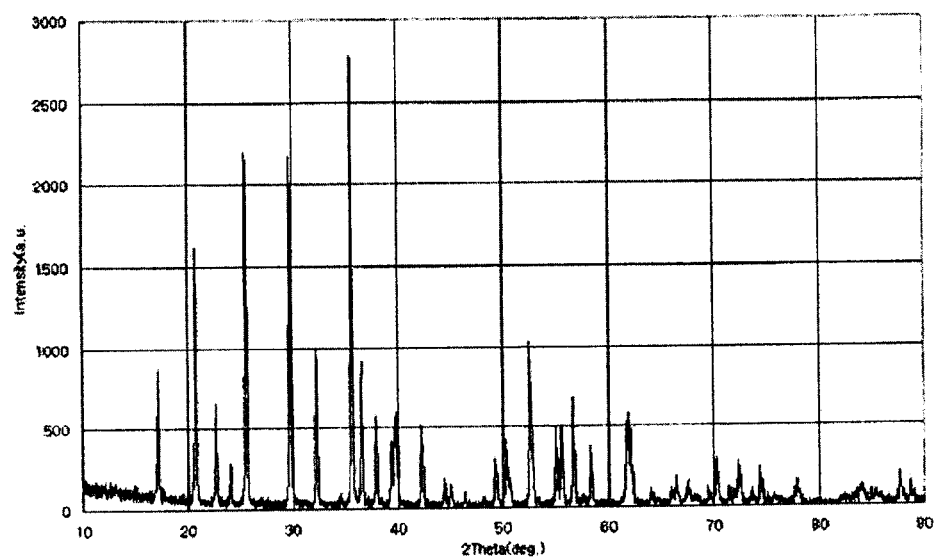
FIG. 17 is an XRD graph of a lithium-metal composite oxide ($LiFePO_4$) synthesized in Example 7.
Figure 18:
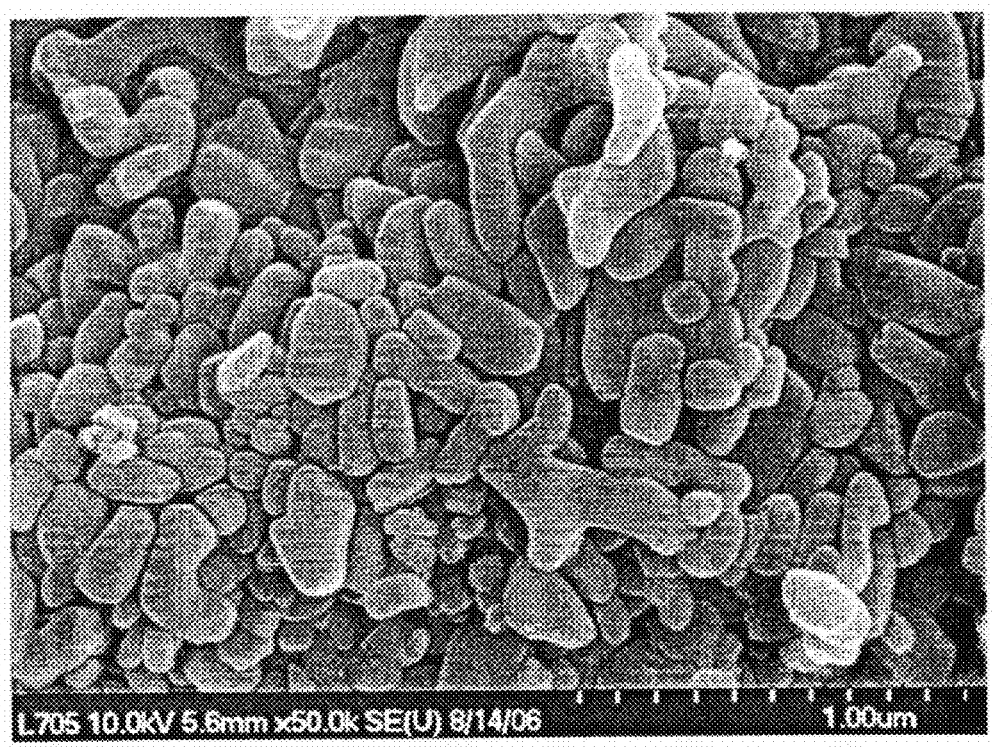
FIG. 18 is an SEM photograph of a lithium-metal composite oxide ($LiFePO_4$) synthesized in Example 7.

An aqueous solution containing 21.32 parts by weight of iron sulfate ($FeSO_4.7H_2O$) and 8.84 parts by weight of phosphoric acid (85 wt %) was pumped under pressure at a rate of 4.8 ml/min in conditions of room temperature and pressure of 250 bar, and a mixture solution containing 13 wt % of ammonia water ($NH_3$) and 6.43 wt % of an aqueous lithium hydroxide solution ($LiOH.H_2O$) was pumped under pressure at a rate of 4.8 ml/min at room temperature, such that the solutions met each other in a first mixer. At this time, sucrose ($C_{12}H_{22}O_{11}$) was added to the aqueous iron sulfate solution in an amount of 10 wt % based on the weight of iron sulfate and fed into the reactor. Herein, the $NH_3/SO_4$ molar ratio was 1.0, and the Li/Fe molar ratio was 2.0. To the mixture, ultrapure water heated to about 450° C. was pumped under pressure at a rate of 96 ml/min at a pressure of 250 bar, such that it met the mixture in a second mixer. The resulting mixture was allowed to reside in a reactor at 405° C. for 7 seconds, and then cooled and concentrated. The concentrate was dried using a spray dryer at 120° C., and then calcined in a nitrogen atmosphere furnace at 600° C. for 12 hours, thus obtaining a lithium-metal composite oxide ($LiFePO_4$). Also, a cathode comprising the lithium-metal composite oxide ($LiFePO_4$) and a lithium secondary battery comprising the cathode were fabricated. XRD data and an SEM photograph of the prepared lithium-metal composite oxide ($LiFePO_4$) are shown in FIGS. 17 and 18, respectively.

Example 8

Lithium-metal composite oxide granules ($Li[Ni_{1/3}Mn_{1/3}CO_{1/3}]O_2$), a cathode comprising the granules, and a lithium secondary battery comprising the cathode, were prepared in the same manner as in Example 1, except that the Li/(Ni+Mn+Co) molar ratio was changed from 4 to 1.

Figure 9:
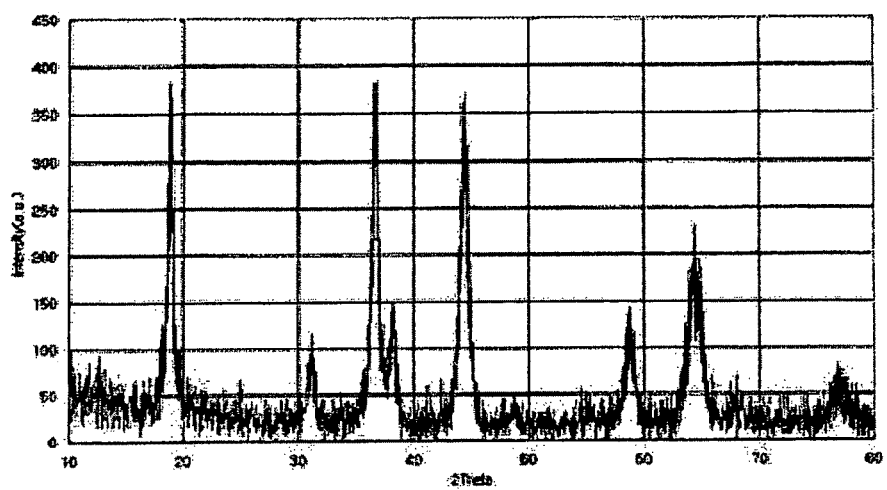
FIG. 9 is an XRD image of a lithium-metal composite oxide ($LiNi_{1/3}Mn_{1/3}Co_{1/3}O_2$) synthesized in Example 8. (a): after drying; and (b): after calcination.
Figure 9:
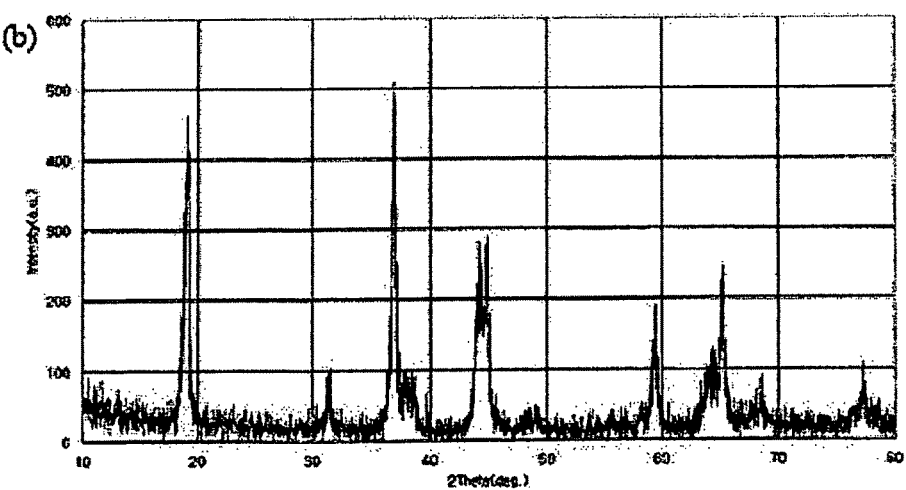

FIGS. 9(a) and 9(b) show the characteristic peaks of $Li[Ni_{1/3}Mn_{1/3}Co_{1/3}]O_2$ after drying and calcination, respectively.

Example 9

Figure 11:
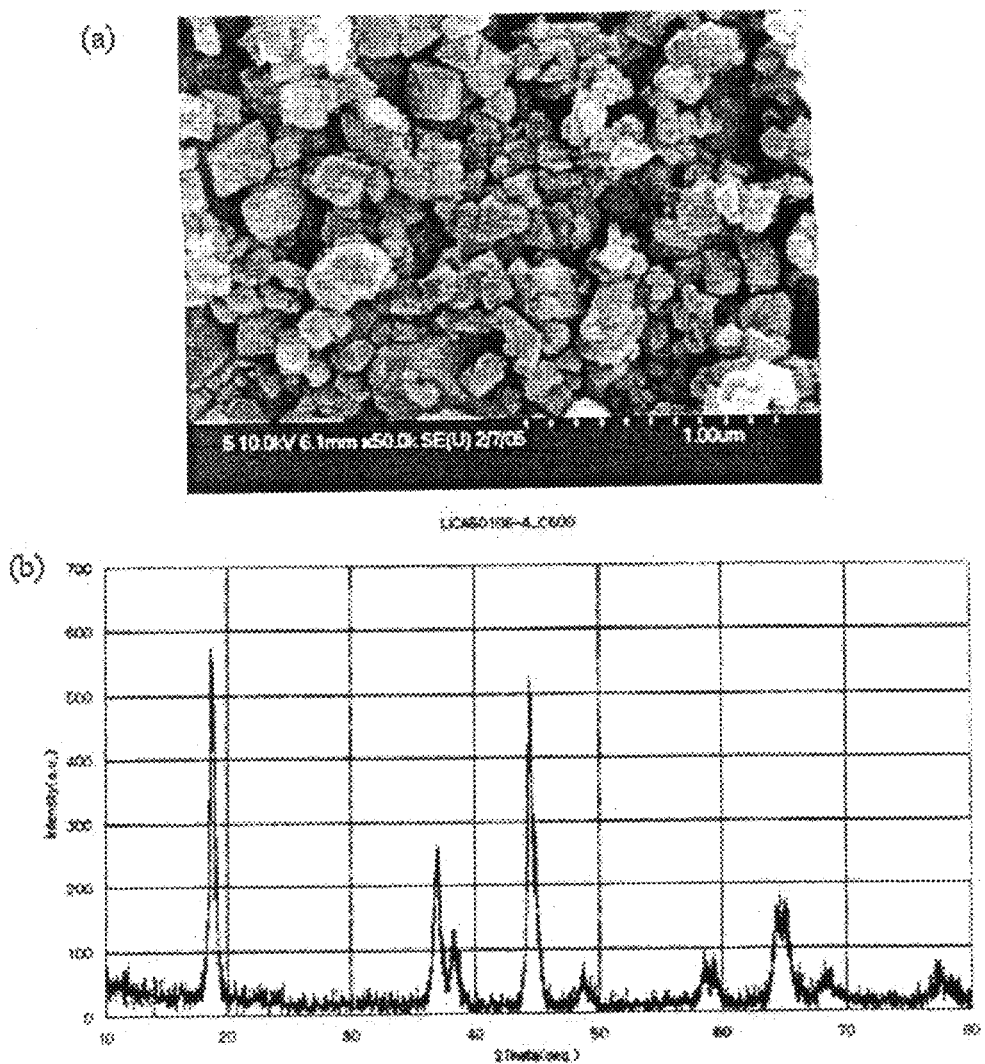
FIG. 11(a) is an FESEM photograph of a lithium metal composite oxide ($LiNi_{1/3}Mn_{1/3}Co_{1/3}O_2$) synthesized in Example 9.
FIG. 11(b) is an XRD graph of the composite oxide synthesized in Example 9.

Lithium-metal composite oxide granules ($Li[Ni_{1/3}Mn_{1/3}Co_{1/3}]O_2$), a cathode comprising the granules, and a lithium secondary battery comprising the cathode, were prepared in the same manner as in Example 1, except that the $NH_3/NO_3$ molar ratio was changed from 1.5 to 3.0, and the calcination temperature was changed from 1000 to 600° C. An SEM photograph and XRD data of the prepared lithium-metal composite oxide ($Li[Ni_{1/3}Mn_{1/3}Co_{1/3}]O_2$) are shown in FIGS. 11(a) and 11(b), respectively.

COMPARATIVE EXAMPLES 1 AND 2

Comparative Example 1

Lithium-metal composite oxide granules ($Li[Ni_{1/3}Mn_{1/3}CO_{1/3}]O_2$), a cathode comprising the granules, and a lithium secondary battery comprising the cathode, were prepared in the same manner as in Example 1, except that the calcination process was omitted.

Figure 10:
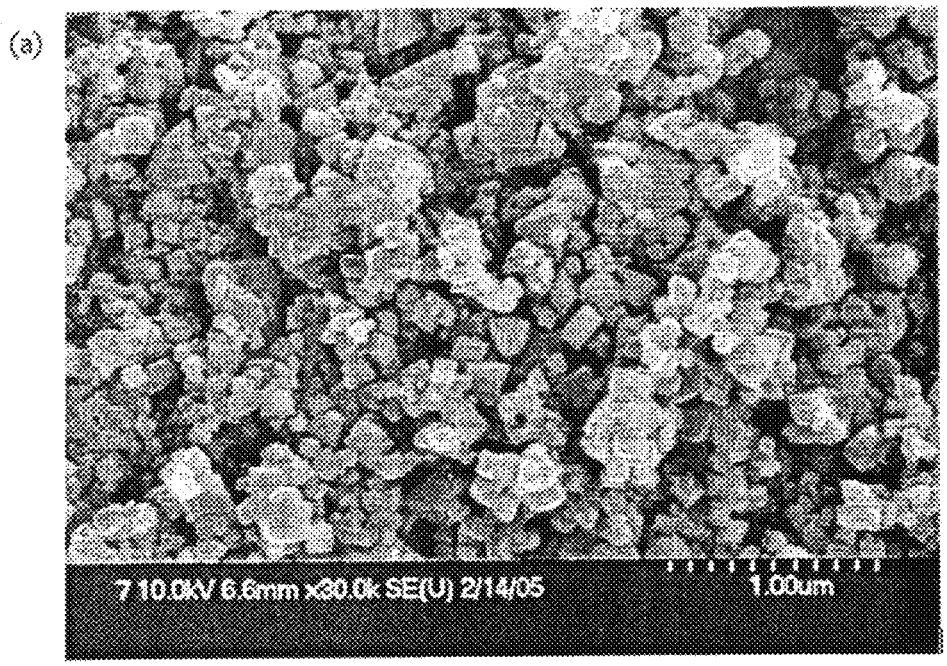
FIG. 10(a) is an FESEM photograph of a lithium metal composite oxide ($LiNi_{1/3}Mn_{1/3}CO_{1/3}O_2$) synthesized in Comparative Example 1.
FIG. 10(b) is an XRD graph of the composite oxide synthesized in Comparative Example 1.
Figure 10:
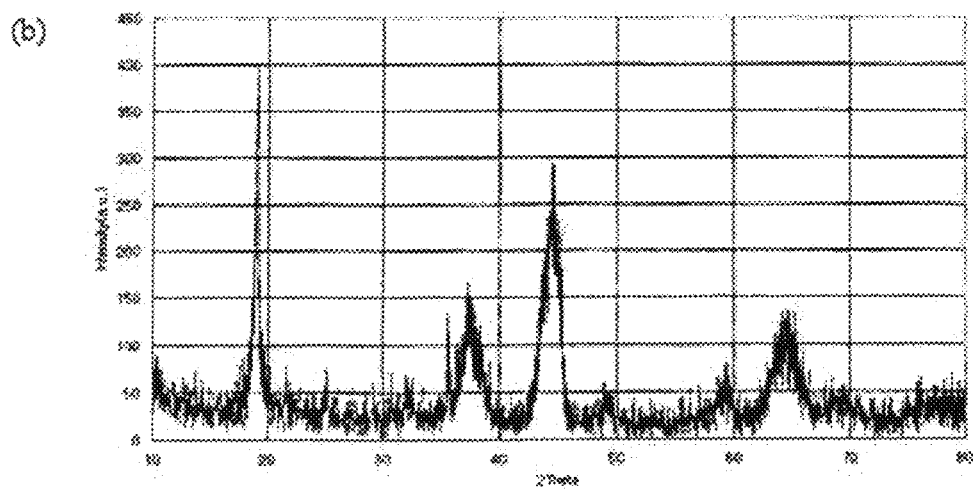

As shown in FIG. 10(a), well-developed crystals having a size of less than about 0.2 μm were synthesized, but as shown in FIG. 10(b), the characteristic peak splitting of $Li[Ni_{1/3}Mn_{1/3}CO_{1/3}]O_2$ was not clear.

Comparative Example 2

Preparation of Lithium-Metal Composite Oxide According to Co-Precipitation Method Cobalt nitrate ($Co(NO_3)_2.6H_2O$), nickel nitrate ($Ni(NO_3)_2.6H_2O$) and manganese nitrate ($Mn(NO_3)_2.6H_2O$) were dissolved in distilled water at an equivalent ratio of 1:1:1, and the solution was slowly added to the same equivalent of an aqueous lithium hydroxide (LiOH) solution with stirring. A 10% NaOH aqueous solution was added in portions to the mixture solution such that the mixture solution reached a pH of about 12. The co-precipitated hydroxide precursor was collected and dried at 120° C. for 12 hours to obtain dried particles. The dried particles were oxidized in an oxidation furnace at 1000° C. for 12 hours. The prepared lithium-metal composite oxide was treated in the same manner as in Example 1-2 and Example 1-3, thus fabricating a cathode and a lithium secondary battery comprising the same. The specific surface area and tap density of the prepared lithium-metal composite oxide ($LiNi_{1/3}Mn_{1/3}CO_{1/3}O_2$) are shown in Table 2 below.

Test Example 1

Evaluation of Physical Properties of Lithium-Metal Composite Oxide in Each Preparation Step A change in physical properties of the lithium-metal composite oxide prepared in each step of the preparation method according to the present invention was measured.

Before the granulation step of the preparation process according to Example 1, after granulation step (Comparative Example 1), and after the granulation and calcination steps (Example 1), the lithium-metal composite oxide ($LiNi_{1/3}Mn_{1/3}CO_{1/3}O_2$) was collected as a sample, 2.5 g of each of the samples was placed in a mole having a diameter of 1.5 cm and pressurized with 4000 Pa for 5 minutes. Then, the thickness of each of the samples was measured.

From the test results, it could be seen that the lithium-metal composite oxide calcined after granulation had a very high packing density compared to that of the lithium-metal composite oxide, which was not subjected to calcination after granulation (see Table 1).

TABLE 1

| | Lithium-metal composite oxide | | |
| --- | --- | --- | --- |
| | Before granulation | After granulation, but before calcinations (Comp. Ex. 1) | After granulation and calcination (Example 1) |
| Thickness (mm) | 12.4 | 4.51 | 3.84 |

Test Example 2

Evaluation of Physical Properties of Lithium-Metal Composite Oxides

In order to evaluate the physical properties of the lithium-metal composite oxides prepared according to the present invention, the following analysis was performed.

The lithium-metal composite oxides prepared in Examples 1 to 9 were used, and the lithium-metal composite oxides prepared in Comparative Examples 1 and 2 were used as a control group.

2-1: SEM Analysis

Surface analysis was performed using a scanning electron microscope (SEM) and, as a result, it could be seen that the lithium-metal composite oxides prepared in Examples 1 to 5 maintained their shape without changes even after drying or calcination and had a uniform spherical shape having a size of about 10-30 μm (see FIGS. 2a, 2b, 4a, 4b and 8a). However, it could be seen that the lithium-metal composite oxide prepared in Comparative Example 1 was in the form of crystals having a size of less than 0.2 μm (see FIG. 10a).

2-2: XRD Analysis

The samples were subjected to XRD (x-ray diffraction) analysis. As a result, it could be seen that the lithium-metal composite oxides prepared in Examples 1 to 5 showed distinct peak splitting at 2 theta values of 30-40° (diffraction lines 006, 102) and 60-70° (diffraction lines 108, 110), and clearly showed the characteristic peaks of $Li[Ni_{1/2}Mn_{1/2}]O_2$ (see FIG. 8b) and the characteristic peaks of $LiNi_{1/3}Mn_{1/3}Co_{1/3}O_2$ (see FIGS. 3, 5, 7a, 7b and 7c).

However, in the lithium-metal composite oxide prepared in Comparative Example, the splitting characteristic peak of $LiNi_{1/3}Mn_{1/3}CO_{1/3}O_2$ was not clearly shown (see FIG. 10b).

2-3: Analysis of Tap Density and Specific Surface Area (BET)

Changes in the specific surface area and tap density of the lithium-metal composite oxide before and after calcination were measured and analyzed. As a result, it could be seen that the lithium-metal composite oxides prepared according to the present invention had small specific surface area and high tap density after calcination compared to the lithium-metal composite oxide prepared in Comparative Example 1 according to a conventional method known in the art (see Table 2). This is believed to be because the spherical granules formed in the drying step was subjected to the calcination step, and thus the growth of crystals constituting the granules well occurred due to the sintering between the crystals to increase the size of the crystals, and the packing efficiency of the granules was excellent due to the spherical shape.

The lithium-metal composite oxides ($LiNi_{1/3}Mn_{1/3}Co_{1/3}O_2$) prepared in Examples 1 and 3(c) were used, and the lithium-metal composite oxide ($LiNi_{1/3}Mn_{1/3}Co_{1/3}O_2$) prepared in Comparative Example 2 according to the co-precipitation method was used as a control group.

The test samples were analyzed in 300 MHz $^7$Li-MAS magic angle spinning) NMR at a spinning rate of 32 kHz, and the analysis results are as follows.

The lithium-metal composite oxide of Comparative Example 2, prepared according to the prior co-precipitation method, showed a sharp peak located around 0 ppm and a very broad peak (500-1000 ppm) having the center of mass at around 240 ppm (see FIG. 12). In this case, the sharp Li peak (peak A) at around 0 ppm showed a Li peak, around of which only diamagnetic transition metal $Co^{3+}$ ($t_{2g}^6 e_g^0$) was coordinated, and this peak suggests that a Co cluster of $Co^{3+}$ was present in a portion of the composite oxide. Also, the significantly broad peak (B) considered to have the center of mass at around 240 ppm showed an Li peak coordinated by paramagnetic and diamagnetic metals (e.g., $Ni^{2+}$ ($t_{2g}^6 e_g^2$), $Mn^{4+}$ ($t_{2g}^6$) and $Co^{3+}$ ($t_{2g}^6 e_g^0$)) and this suggests that chemical shift values are significantly shifted and expanded due to the interactions between the unpaired electrons of paramagnetic metals (e.g., $Ni^{2+}$ and $Mn^{4+}$) and lithium nuclei. As a result, in the prior lithium-metal composite oxide prepared according to the conventional method, chemical shift values are various due to plural interactions depending on the orientation between Li nuclei and the unpaired electrons of paramagnetic metals, and plural peaks having such various chemical shift values are overlapped to form a significantly broad peak. In short, it is considered that the paramagnetic and diamagnetic metals of the lithium-metal composite oxide are randomly distributed around lithium, rather than present in the oxide itself in a uniformly mixed state.

In comparison with this, it could be seen that the lithium-metal composite oxide of the present invention showed not only a great decrease in the intensity of a Li peak around a Co cluster, but also a significant decrease in the line width of the broadest peak, despite that it had the same components and composition as those of Comparative Example 2 (see FIG. 12 and Table 3).

A decrease in the ratio of the intensity of a peak located around 0 ppm to the intensity of a peak located around 240 ppm, ($I_{0ppm}/I_{240ppm}$), means a decrease in the clustering of diamagnetic metals in the composite oxide, that is, a decrease in Co segregation. In fact, in order to express changes in $I_A/I_B$ ($I_{0ppm}/I_{240ppm}$) values as numerical values, the overlapped main peaks (A and B) and spinning side bands were separated by fitting according to the deconvolution method, and the intensity of each of the main peaks was calculated. The cal-

TABLE 2

| Properties | Conditions | Examples | | | | | | Comparative Example 2 |
| --- | --- | --- | --- | --- | --- | --- | --- | --- |
| | | 1 | 2 | 3a | 3B | 3c | 5 | |
| Specific surface area (m²/g) | Before calcination | 9 | 7.8 | 9.5 | 9 | 8.6 | 8.5 | 8.3 |
| | After calcination | 0.23 | 0.31 | 0.43 | 0.40 | 0.23 | 0.31 | 0.63 |
| Tap density (g/cc) | Before calcination | 1.8 | 1.95 | 1.8 | 1.85 | 1.9 | 1.7 | 1.3 |
| | After calcination | 2.4 | 2.4 | 2.4 | 2.55 | 2.6 | 2.4 | 2.0 |

2-4: Li-NMR Analysis culation results are shown in Table 3 below. Because a decrease in $I_A/I_B$ ($I_{0ppm}/I_{240ppm}$) value means a decrease in Co segregation, it could be seen that the lithium-metal composite oxide of the present invention showed a great decrease in the clustering of a specific metal in crystals, that is, a great decrease in Co segregation, compared to the lithium-metal composite oxide prepared according to the prior method. This suggests that the metal components of the lithium-metal composite oxide according to the present invention were more uniformly distributed (see FIG. 12 and Table 3).

Also, a decrease in line width between the peaks, ($W_{240ppm}/W_{0ppm}$), suggests that the ordering of paramagnetic and diamagnetic metals (e.g., Ni, Mn and Co) in the crystalline structure of the composite oxide was relatively improved, and thus the broadening of the Li peak coordinated with these metals was decreased. In fact, in order to express, as a numerical value, a visible change in the line width of the broad peak (peak B) located around 240 ppm, the peak located around 240 ppm and spinning side band peaks were separated and fitted according to the deconvolution method, and then the ratio of the average line width of these peaks to the line width of the sharp peak located around 0 ppm was calculated. Because a decrease in the ratio of line width between the peaks, ($W_B/W_A$), means a decrease in the broadening of the Li peaks coordinated with Ni, Mn and Co, and thus it could be seen that the lithium-metal composite oxide of the present invention showed a decrease in paramagnetic intensity locally interacting with Li ions, compared to the lithium-metal composite oxide prepared in Comparative Example 2 according to the conventional method, and showed a regular arrangement of $Ni^{2+}/Mn^{4+}/Co^{3+}$ in the oxide. This suggests that the metal components of the lithium-metal composite oxide according to the present invention were more uniformly distributed, leading to an improvement in the ordering of metals.

Herein, the ratios of intensity and line width between the above-described peaks are influenced by magnetic intensity in Li-NMR, MAS spinning rate, the composition and valence of a transition metal, etc., and thus, when the measurement of the ratios is performed in conditions different from the measurement conditions of the present invention, results different from those of the present invention can be obtained. For this reason, the ratios of intensity and line width between specific peaks in the present invention are meaningful only in the conditions suggested in the present invention.

TABLE 3

|  | Comparative Example 2 (NMC) | Example 1 | Example 3(c) |
| --- | --- | --- | --- |
| $I_A/I_B$ | 0.039 | 0.021 | 0.012 |
| $W_B/W_A$ | 21.45 | 20.30 | 15.31 |

$I_A$: Intensity of Li peak around Co cluster;
$I_B$: Intensity of Li peak around Ni, Mn and Co;
$W_A$: Line width (Hz) of Li peak around Co cluster, and
$W_B$: Average line width (Hz) of broad lithium peaks around Ni, Mn and Co.

Test Example 3

Evaluation of Performance of Lithium Secondary Battery

The performance of a lithium secondary battery comprising the lithium-metal composite oxide of the present invention was evaluated in the following manner.

3-1: Evaluation of Charge/Discharge Capacity

The lithium secondary battery comprising the lithium-metal composite oxide of the present invention was charged to 4.4 V in constant-current and constant-voltage (CC/CV) modes and discharged to 3 V in a constant-current (CC) mode. The rate characteristics of the battery was obtained by charging and discharging the battery in the following sequence: 2 cycles at 0.1 C, 2 cycles at 0.2 C, 1 cycle at 0.5 C, and 1 cycle at 1 C. Then, the battery was subjected to charge/discharge cycles at 0.5 C.

From the test results, it could be seen that the lithium secondary battery of Example 3(c), employing the lithium-metal composite oxide granules ($LiNi_{1/3}Mn_{1/3}Co_{1/3}O_2$) as a cathode active material, showed a charge capacity of 192 mAh/g and a discharge capacity of 176 mAh/g, suggesting that the battery could achieve excellent performance (see FIG. 13).

3-2: Evaluation of Cycle Life Characteristics

Lithium secondary batteries that comprise, as a cathode active material, each of the lithium-metal composite oxides ($LiNi_{1/3}Mn_{1/3}Co_{1/3}O_2$) prepared in Examples 1, 3 (c) and 9, were used. The battery of Comparative Example 1, prepared without performing the calcination process, was used as a control group.

Figure 15:
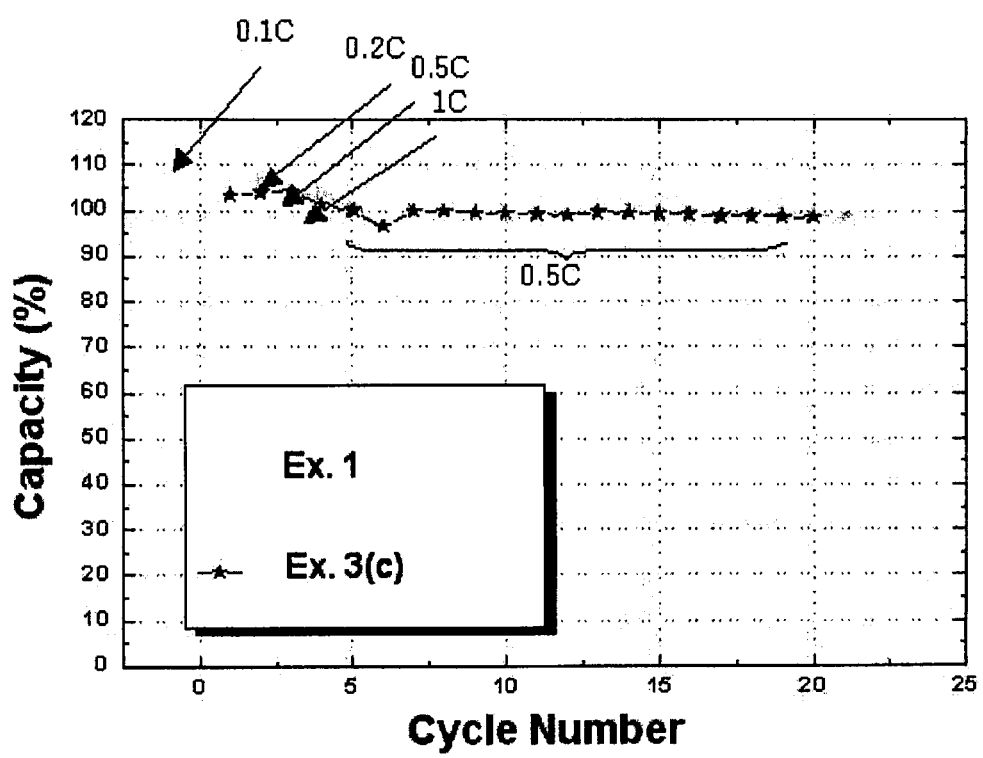
FIG. 15 is a graphic diagram showing the cycle life characteristics of lithium secondary batteries, which comprise, as a cathode active material, a lithium-metal composite oxide ($LiNi_{1/3}Mn_{1/3}CO_{1/3}O_2$) synthesized in each of Examples 1 and 3(c).
Figure 16:
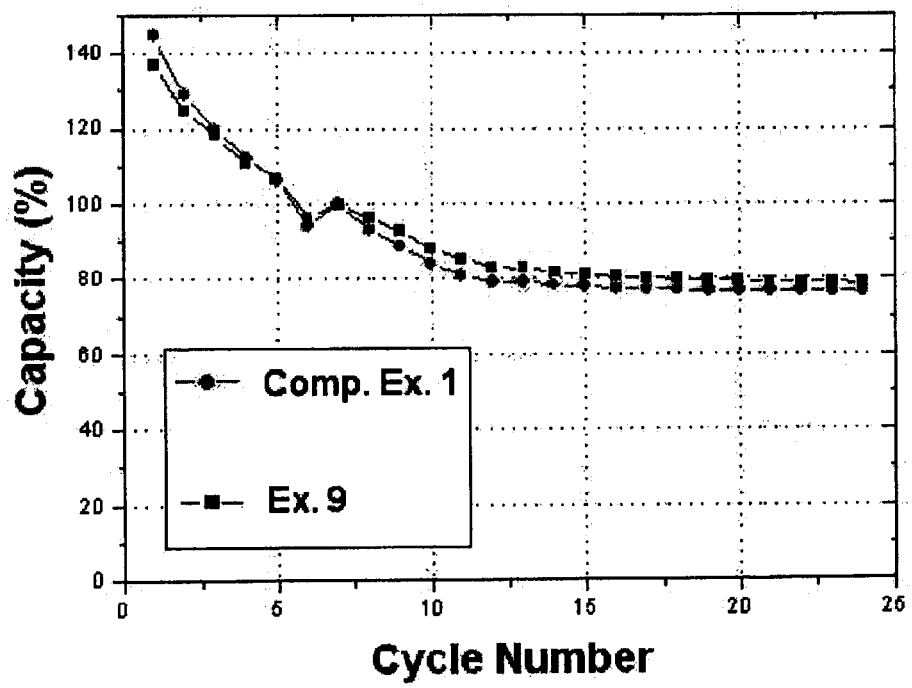
FIG. 16 is a graphic diagram showing the cycle life characteristics of lithium secondary batteries, which comprise, as a cathode active material, a lithium-metal composite oxide ($LiNi_{1/3}Mn_{1/3}CO_{1/3}O_2$) synthesized in each of Comparative Example 1 and Example 9.

From the test results, it could be seen that the battery of Comparative Example 1 showed a rapid reduction in the performance thereof within a few charge/discharge cycles (see FIG. 16). However, the lithium secondary batteries comprising each of the cathode active materials prepared in Examples 1 and 3 showed little or no reduction in the performance thereof even after 20 charge/discharge cycles (see FIG. 15).

3-3: Evaluation of Performance with Conventional Lithium-Metal Composite Oxide

Lithium secondary batteries, which comprise, as a cathode active material, each of lithium-metal composite oxides consisting of the same components, were comparatively evaluated with respect to the performance thereof.

For this purpose, lithium secondary batteries, which comprise, as a cathode active material, each of the lithium-metal composite oxide ($LiNi_{1/3}Mn_{1/3}Co_{1/3}O_2$) prepared in Examples 1 and 3(c), were used, and the battery of Comparative Example 2, prepared according to the co-precipitation method, was used as a control group.

From the test results, it could be seen that the batteries of Examples 1 and 3, comprising the inventive lithium-metal composite oxide as a cathode active material, had excellent rate characteristics compared to the battery of Comparative Example 2 (see FIG. 14).

Test Example 4

Examination of Relationship Between Grain Size of Lithium-Metal Composite Oxide and Performance of Lithium Secondary Battery In order to examine the relationship between the grain size of the lithium-metal composite oxide prepared according to the present invention and the performance of a battery, the following test was performed.

Table 4 below shows the grain sizes of the lithium-metal composite oxide ($LiNi_{1/3}Mn_{1/3}Co_{1/3}O_2$) of Examples 1 and 3(c) and the lithium-metal composite oxide of Comparative Example 2 (co-precipitation method). Herein, the grain sizes were determined by the Scherrer's equation based on the half width of peaks after XRD measurement.

Generally, a decrease in the grain size of electrode active material leads to an improvement in the rate characteristics of a battery. Thus, the grain size of each of the lithium-metal composite oxides prepared in the present invention and the lithium-metal composite oxide prepared according to the co-precipitation method (Comparative Example 2) was measured. As a result, it could be seen that, even though the lithium-metal composite oxides of the present invention had a grain size significantly larger than that of the lithium-metal composite oxide prepared according to the co-precipitation method (Comparative Example 2), it showed good rate characteristics (see FIG. 14).

Also, the lithium-metal composite oxide according to the present invention may have advantages in that it easily improve the rate characteristics of a battery by controlling the grain size thereof and that an increase in the grain size of the grains leads to an increase in the tap density and packing density thereof (see Table 4). Also, an increase in packing density leads to an increase in electrode density, thus making it to realize a high-capacity battery.

TABLE 4

|  | Comparative Example 2 | Example 1 | Example 3 (c) |
|---|---|---|---|
| Grain Size (nm) | 339 | 668 | 1000 |

INDUSTRIAL APPLICABILITY

As can be seen from the foregoing, according to the present invention, the lithium-metal composite oxide synthesized based on the prior supercritical hydrothermal synthesis method is subjected either to calcination or to granulation and then calcination. Thus, unlike the prior dry calcination method or wet precipitation method, a uniform solid solution can be formed and the ordering of metals in the composite oxide can be improved. Accordingly, the lithium-metal composite oxide of the present invention has crystal stability and excellent properties, and thus can provide a battery having high capacity and long cycle life characteristics.

Although the preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A method for preparing a lithium-metal composite oxide, the method comprising the steps of:
  (a) mixing an aqueous solution of one or more transition metal-containing precursor compounds with an alkalifying agent and a lithium precursor compound, in which the aqueous solution is not under supercritical or subcritical conditions, to precipitate hydroxides of the transition metals;
  (b) mixing the mixture of step (a) with water under supercritical or subcritical conditions to synthesize a lithium-metal composite oxide, and drying the lithium-metal composite oxide; and
  (c) subjecting the dried lithium-metal composite oxide either to calcination or to granulation and then calcination.

2. The method for preparing a lithium composite oxide of claim 1, wherein the step (c) can grow crystals of the lithium-metal composite oxide synthesized in the step (b) and, at the same time, can increase the adhesion between the crystals.

3. The method for preparing a lithium-metal composite oxide of claim 1, wherein the transition metal-containing precursor compounds are selected from the group consisting of transition metal-containing nitrates, sulfates and acetates, and the lithium precursor compound is selected from the group consisting of lithium hydroxide and lithium nitrate.

4. The method for preparing a lithium-metal composite oxide of claim 1, wherein the alkalifying agent is a compound selected from the group consisting of alkali metal hydroxides, alkaline earth metal hydroxides and ammonia compounds.

5. The method for preparing a lithium-metal composite oxide of claim 1, wherein the molar ratio of lithium to the transition metals (Li/transition metals) in the step (b) is 1.0-20.

6. The method of preparing a lithium-metal composite oxide of claim 1, wherein the alkali equivalent ratio of the mixture in step (b) is in a range of 1-10.

7. The method of preparing a lithium-metal composite oxide of claim 1, wherein the water under supercritical or subcritical conditions in the step (b) has a pressure of 180-550 bar and a temperature of 200-700° C.

8. The method for preparing a lithium-metal composite oxide of claim 1, which is carried out in a first mixer, a second continuous mixer and a reactor connected with the mixers, in which the step (a) is carried out in the first mixer to form a uniform precipitate of the transition metal hydroxides, and lithium hydroxide present in the mixture in the first mixer is subjected to the step (b) in the second mixer and reactor connected with the first mixer so as to synthesize the lithium-metal composite oxide in which lithium ions are inserted into the precipitated transition metal hydroxides.

9. The method for preparing a lithium-metal composite oxide of claim 1, wherein the granulation in the step (c) is carried out using a method selected from the group consisting of a spray drying method, a fluidized bed drying method and a vibration drying method.

10. The method for preparing a lithium-metal composite oxide of claim 1, wherein the calcination in the step (c) is carried out at a temperature of 600-1200° C.

11. The method for preparing a lithium-metal composite oxide of claim 1, wherein at least one additive selected from the group consisting of a binder, a sintering aid, a doping agent, a coating agent, a reducing agent, an oxidizing agent, an acid, carbon, a carbon precursor, metal oxide and a lithium compound is additionally used before, after or during any one step of the steps (a) to (c).

12. The method of preparing a lithium-metal composite oxide of claim 11, wherein the additive is a compound containing at least one element selected from the group consisting of Li, Al, Zr, Mg, Ti, C, P, halogen, and combinations thereof.

13. The method of preparing a lithium-metal composite oxide of claim 1, wherein the alkali equivalent ratio of the mixture in step (b) is in a range of 1-10.

14. A method for preparing a lithium-metal composite oxide, the method comprising the steps of:
  (a) mixing an aqueous solution of one or more transition metal-containing precursor compounds with an alkalifying agent and a lithium precursor compound, in which the aqueous solution is not under supercritical or subcritical conditions, to precipitate hydroxides of the transition metals;
  (b) mixing the mixture of step (a) with water under supercritical or subcritical conditions to synthesize a lithium-metal composite oxide, and drying the lithium-metal composite oxide; and (c) subjecting the dried lithium-metal composite oxide either to calcination or to granulation and then calcinations;

wherein the dried lithium-metal composite oxide satisfies any one of the following conditions: (1) the ratio of intensity between a main peak of $0\pm10$ ppm ($I_{0ppm}$) and a main peak of $240\pm140$ ppm ($I_{240ppm}$), ($I_{0ppm}/I_{240ppm}$), is less than 0.117 Z wherein Z is the ratio of moles of the diamagnetic metal to moles of lithium; (2) the ratio of line width between the main peak of $0\pm10$ ppm ($I_{0ppm}$) and the main peak of $240\pm140$ ppm ($I_{240ppm}$), ($W_{240}$ ppm/$W_{0ppm}$) is less than 21.45; and (3) both the conditions (a) and (b), the peaks being obtained according to $^7$Li-NMR measurement.

15. The method for preparing a lithium-metal composite oxide of claim 14, wherein the transition metal-containing precursor compounds are selected from the group consisting of transition metal-containing nitrates, sulfates and acetates, and the lithium precursor compound is selected from the group consisting of lithium hydroxide and lithium nitrate.

16. The method for preparing a lithium-metal composite oxide of claim 14, wherein the alkalifying agent is a compound selected from the group consisting of alkali metal hydroxides, alkaline earth metal hydroxides and ammonia compounds.

17. The method for preparing a lithium-metal composite oxide of claim 14, wherein the molar ratio of lithium to the transition metals (Li/transition metals) in the step (b) is 1.0-20.

18. The method of preparing a lithium-metal composite oxide of claim 14, wherein the water under supercritical or subcritical conditions in the step (b) has a pressure of 180-550 bar and a temperature of 200-700° C.

19. The method for preparing a lithium-metal composite oxide of claim 14, wherein the calcination in the step (c) is carried out at a temperature of 600-1200° C.

20. The method for preparing a lithium-metal composite oxide of claim 14, wherein at least one additive selected from the group consisting of a binder, a sintering aid, a doping agent, a coating agent, a reducing agent, an oxidizing agent, an acid, carbon, a carbon precursor, metal oxide and a lithium compound is additionally used before, after or during any one step of the steps (a) to (c).

* * * * *